(12) United States Patent
Hamaguchi et al.

(10) Patent No.: US 8,520,748 B2
(45) Date of Patent: Aug. 27, 2013

(54) TRANSMITTER, OFDM COMMUNICATION SYSTEM, AND TRANSMISSION METHOD

(75) Inventors: Yasuhiro Hamaguchi, Ichihara (JP); Kimihiko Imamura, Vancouver, WA (US); Shimpei To, Chiba (JP); Hideo Namba, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 1107 days.

(21) Appl. No.: 12/088,816

(22) PCT Filed: Oct. 3, 2006

(86) PCT No.: PCT/JP2006/319764
§ 371 (c)(1), (2), (4) Date: Mar. 31, 2008

(87) PCT Pub. No.: WO2007/040218
PCT Pub. Date: Apr. 12, 2007

(65) Prior Publication Data
US 2009/0135925 A1    May 28, 2009

(30) Foreign Application Priority Data
Oct. 3, 2005   (JP) .................................. 2005-289878

(51) Int. Cl.
*H04K 1/10* (2006.01)
(52) U.S. Cl.
USPC ........... 375/260; 375/267; 375/264; 375/299; 455/101; 455/102; 455/103; 455/500; 455/59; 455/60; 455/61
(58) Field of Classification Search
USPC ............... 375/260, 267, 264, 299; 455/101, 455/102, 103, 500, 59, 60, 61
See application file for complete search history.

(56) References Cited

U.S. PATENT DOCUMENTS

| 7,545,772 | B2 * | 6/2009 | Hwang et al. ................. 370/329 |
| 2004/0042386 | A1 * | 3/2004 | Uesugi et al. ................. 370/204 |
| 2006/0160496 | A1 * | 7/2006 | Murakami et al. ............ 455/102 |
| 2007/0201572 | A1 * | 8/2007 | Krauss et al. ................. 375/260 |
| 2008/0112495 | A1 * | 5/2008 | Gore et al. .................... 375/260 |

FOREIGN PATENT DOCUMENTS

JP    2006-141031 A    6/2006

OTHER PUBLICATIONS

NTTDoCoMo, pilot channel and scrambling code in Evolved UTRA downlink, Jun. 20-21, 2005,3GPP TSG WG1 ad hoc on LTE,R1-050589, pp. 1-24.*
"Pilot Channel and Scrambling Code in Evolved UTRA Downlink", 3GPP TSG RAN WG1 Ad Hoc on LTE, Sophia Antipolis, France, Jun. 20-21, R1-050589.
Yoshihisa Kishiyama et al., IEICE Communications Society Taikai Koen Ronbunshu 1, 2005.09, B-5-45, p. 445.

(Continued)

Primary Examiner — Daniel Washburn
Assistant Examiner — Rahel Guarino
(74) Attorney, Agent, or Firm — Birch, Stewart, Kolasch & Birch, LLP

(57) ABSTRACT

In a cellular system using an OFDM scheme, a transmitter multiplies subcarriers for channel estimation by codes and transmits them, the codes being such that a phase difference φ of the code multiplied with consecutive subcarriers for channel estimation is constant, and a code of every M consecutive subcarriers (M being 2 or an integer greater than 2) is mutually orthogonal with a code multiplied with same subcarriers of another transmitter.

24 Claims, 26 Drawing Sheets

(56) References Cited

OTHER PUBLICATIONS

"Intra-Node B Macro Diversity bas on Cyclic Delay Transmissions", 3GPP TSG RAN WG1 #42 on LTE, London, UK Aug. 29-Sep. 2, 2005, R1-050795.

"Orthogonal Common Pilot Channel and Scrambling Code in Evolved UTRA Downlink", 3GPP TSG RAN WG1 #42 on LTE, London, UK, Aug. 29 Sep. 2, 2005, RI-050704.

"Intra-Node B Macro Diversity Using Simultaneous Transmission with Soft-combining in Evolved UTRA Downlink", 3GPP TSG RAN WG1 #42 on LTE, London, UK, Aug.-Sep. 2, 2005, R1050700.

Ryoko Kawauchi et al., "Application of Cyclic Delay Transmit Diversity to DS-CDMA using Frequency-domain Equalization", Technical Report of IEICE, WBS2004-124, A, P2004-305, RCS2004-392, MoMuC2004-175, MW2004-302(Mar. 2005), pp. 13-17.

* cited by examiner

FIG. 14A

| | | | | | | | | |
|---|---|---|---|---|---|---|---|---|
| 1 | 1 | 1 | 1 | 1 | 1 | 1 | 1 | —4105 |
| 1 | −1 | 1 | −1 | 1 | −1 | 1 | −1 | |
| 1 | 1 | −1 | −1 | 1 | 1 | −1 | −1 | } 4104 |
| 1 | −1 | −1 | 1 | 1 | −1 | −1 | 1 | |
| 1 | 1 | 1 | 1 | −1 | −1 | −1 | −1 | |
| 1 | −1 | 1 | −1 | −1 | 1 | −1 | 1 | |
| 1 | 1 | −1 | −1 | −1 | −1 | 1 | 1 | |
| 1 | −1 | −1 | 1 | −1 | 1 | 1 | −1 | |

FIG. 14B

| | | | | | | | | |
|---|---|---|---|---|---|---|---|---|
| $e^{j0}$ | $e^{j0}$ | $e^{j0}$ | $e^{j0}$ | $e^{j0}$ | $e^{j0}$ | $e^{j0}$ | $e^{j0}$ | —4101a |
| $e^{j0}$ | $e^{j\frac{\pi}{4}}$ | $e^{j\frac{\pi}{2}}$ | $e^{j\frac{3\pi}{4}}$ | $e^{j\pi}$ | $e^{j\frac{5\pi}{4}}$ | $e^{j\frac{3\pi}{2}}$ | $e^{j\frac{7\pi}{4}}$ | —4101b |
| $e^{j0}$ | $e^{j\frac{\pi}{2}}$ | $e^{j\pi}$ | $e^{j\frac{3\pi}{2}}$ | $e^{j2\pi}$ | $e^{j\frac{5\pi}{2}}$ | $e^{j3\pi}$ | $e^{j\frac{7\pi}{2}}$ | —4101c |
| $e^{j0}$ | $e^{j\frac{3\pi}{4}}$ | $e^{j\frac{3\pi}{2}}$ | $e^{j\frac{9\pi}{4}}$ | $e^{j3\pi}$ | $e^{j\frac{15\pi}{4}}$ | $e^{j\frac{9\pi}{2}}$ | $e^{j\frac{21\pi}{4}}$ | —4101d |
| $e^{j0}$ | $e^{j\pi}$ | $e^{j2\pi}$ | $e^{j3\pi}$ | $e^{j4\pi}$ | $e^{j5\pi}$ | $e^{j6\pi}$ | $e^{j7\pi}$ | —4101e |
| $e^{j0}$ | $e^{j\frac{5\pi}{4}}$ | $e^{j\frac{5\pi}{2}}$ | $e^{j\frac{15\pi}{4}}$ | $e^{j5\pi}$ | $e^{j\frac{25\pi}{4}}$ | $e^{j\frac{15\pi}{2}}$ | $e^{j\frac{35\pi}{4}}$ | —4101f |
| $e^{j0}$ | $e^{j\frac{3\pi}{2}}$ | $e^{j3\pi}$ | $e^{j\frac{9\pi}{2}}$ | $e^{j6\pi}$ | $e^{j\frac{15\pi}{2}}$ | $e^{j9\pi}$ | $e^{j\frac{21\pi}{2}}$ | —4101g |
| $e^{j0}$ | $e^{j\frac{7\pi}{4}}$ | $e^{j\frac{7\pi}{2}}$ | $e^{j\frac{21\pi}{4}}$ | $e^{j7\pi}$ | $e^{j\frac{35\pi}{4}}$ | $e^{j\frac{21\pi}{2}}$ | $e^{j\frac{49\pi}{4}}$ | —4101h |

CONVENTIONAL ART
FIG. 25A
CONVENTIONAL ART
FIG. 25B
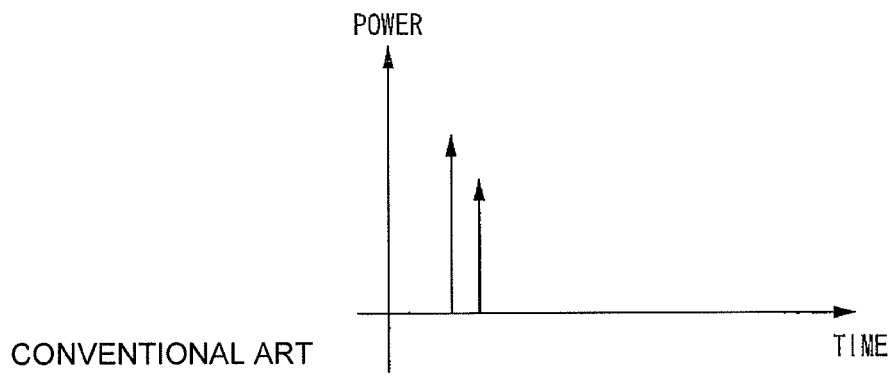
CONVENTIONAL ART
FIG. 26
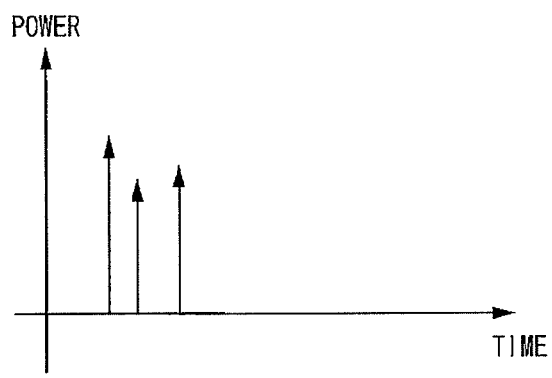
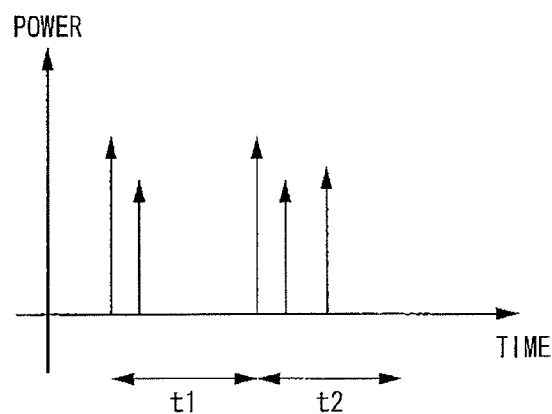

US 8,520,748 B2

TRANSMITTER, OFDM COMMUNICATION SYSTEM, AND TRANSMISSION METHOD

TECHNICAL FIELD

The present invention relates to a transmitter that, in a cellular system using the orthogonal frequency division multiplexing (OFDM) scheme, multiplies subcarriers for channel estimation by a code and performs communication, an OFDM communication system, and a transmission method.

Priority is claimed on Japanese Patent Application No. 2005-289979, filed Oct. 3, 2005, the content of which is incorporated herein by reference.

BACKGROUND ART

There is a recent proposal for multicarrier transmission using cyclic delay transmit (CDT) diversity, whereby simultaneous transmission is made from a transmitter including a plurality of transmission antennas while adding (cyclic) delays differing for the respective transmission antennas (Non-Patent Literature 1). Since use of this transmission diversity scheme enables channel frequency selectivity to be constantly strengthened, excellent average bit error rate (BER) characteristics can be obtained.

It is also proposed that excellent average BER characteristics can be obtained when CDT diversity is applied in a technique known as soft-combining, which can obtain site diversity effect in evolved UTRA and UTRAN in a 3rd generation partnership project (3GPP) by simultaneously transmitting signals using a same frequency from transmission antennas belonging to respective sectors in a base station which is a transmitter including a plurality of sectors, to, in particular, a single receiver positioned near the edge of a sector, and receiving a combined wave on the receiver side (Non-Patent Literature 2).

FIG. 24 is a conceptual diagram of a state where signals are transmitted from transmission antennas 1 and 2 provided in transmitters belonging to two different sectors, to reception antenna 3 provided in a receiver. As shown in the figure, the signals are transmitted from transmission antenna 1 and transmission antenna 2, and a combined wave is received by reception antenna 3 of the receiver.

FIG. 25A is a delay profile h1 expressing a channel between transmission antenna 1 (FIG. 24) and reception antenna 3 of the receiver (FIG. 24) in the time domain, and FIG. 25B is a delay profile h2 expressing a channel between transmission antenna 2 (FIG. 24) and reception antenna 3 of the receiver (FIG. 24) in the time domain. The horizontal axes represent time, and the vertical axes represent power.

When the signal transmitted from transmission antenna 2 is obtained by delaying the signal transmitted from transmission antenna 1, i.e., when CDT diversity is applied between transmission antenna 1 and transmission antenna 2, as shown in FIG. 26, the transmission signals can be regarded as reaching reception antenna 3 (FIG. 24) after traveling along a channel combining the delay profiles h1 and h2. Here, time range t1 corresponds to the delay profile h1 (FIG. 25A) and time range t2 corresponds to the delay profile h2 (FIG. 25B).

On the other hand, a method is proposed of multiplying subcarriers for channel estimation by orthogonal codes that are unique for respective sectors, simultaneously transmitting the subcarriers for channel estimation using a same frequency, and separating the subcarriers for channel estimation of the respective sectors at the receiver side, enabling channels to be individually estimated (Non-Patent Literatures 3 and 4).

FIG. 27A is a signal transmitted from transmission antenna 1 (FIG. 24), where range 4 represents a subcarrier for channel estimation and range 5 represents a shared data channel. Moreover, FIG. 27B is a signal transmitted from transmission antenna 2 (FIG. 24), where range 6 represents a subcarrier for channel estimation and range 7 represents a shared data channel.

Subcarriers for channel estimation contained in ranges 4 and 6 are used to obtain channel data required to demodulate data contained in ranges 5 and 7; normally, as shown in FIG. 28, different orthogonal codes are multiplied for respective sectors #1 to #3 and transmitted.

In FIG. 28 the horizontal axis represents frequency, and the uppermost stream 8 represents an arrangement of subcarriers in multicarrier communication. Three streams 9 to 11 therebelow represent orthogonal codes that respective subcarriers are multiplied by at transmission antennas 1a, 1b, and 1c (not shown) respectively belonging to sectors #1 to #3.

For example, the signal from transmission antenna 1a, which adds the values of all carriers in frequency range f1, is contained in the addition result but the signal components from transmission antennas 1b and 1c are 0, and thus signals from the respective sectors can be separated even if the signals are transmitted using the same frequency at the same time. This state is described as "orthogonality is maintained".

On the other hand, when CDT diversity is applied to the transmission antennas 1a to 1c between the sectors #1 to #3, as mentioned above, in order to demodulate ranges 5 and 7 (FIG. 27), channel data must be acquired from the subcarriers for channel estimation contained in ranges 4 and 6 (FIG. 27); therefore, a same delay is usually added to ranges 6 and 7 of the signals transmitted from transmission antenna 1b.

However, since orthogonality between the orthogonal codes is destroyed when CDT diversity is applied to the transmission antennas between the sectors, if it is attempted to use subcarriers for channel estimation in separately estimating channels between the transmission antennas of the respective sectors and the receiver, there is a danger of error in the channel estimation result.

FIG. 29 is a diagram showing a transmission signal when delay profiles h1=h2=1, i.e. when there is no delayed wave, and there is no phase rotation and no change in the amplitude of the direct wave. Let us consider that multicarrier transmission is performed, with a delay of half a symbol being appended between transmission antennas 1 and 2 of FIG. 24.

Let us consider that diversity by the soft-combining method is used between the transmission antennas 1 and 2, and also consider only signals transmitted from transmission antennas 1 and 2 for a while. The soft-combining method is a method whereby two sectors transmit same signals, which are created from the same data, at the same timing to a same receiver, whereby increasing the signal component at the receiver while suppressing the interference component.

In the transmission signal transmitted from transmission antenna 2 (FIG. 24), a phase rotation shown in equation (1) below is applied to a kth subcarrier.

$$\theta = 2\pi k T/N = 2\pi k \cdot N/2 \cdot N = k\pi \qquad (1)$$

At this time, the signal from transmission antenna 2 (FIG. 24) becomes as shown in FIG. 29, and orthogonality with the transmission signal from transmission antenna 1 (FIG. 24) is destroyed.

In equation (1), N represents the number of points of an inverse fast Fourier transform (IFFT) made during multicarrier modulation, and T represents a delay point difference (delay time difference) between the two antennas.

[Non-Patent Literature 1] Technical Report of IEICE (the Institute of Electronics, Information, and Communication Engineers), RCS2004-392, "Application of Cyclic Delay Transmit Diversity to DS-CDMA using Frequency-domain Equalization", the Institute of Electronics, Information, and Communication Engineers, March 2005

[Non-Patent Literature 2] 3GPP Contribution, R1-050795, "Intra-Node B Macro Diversity based on Cyclic Delay Transmissions", [Search Sep. 7, 2005], Internet (URL: ftp://ftp.3gpp.org/TSG_RAN/WG1_RL1/TSGR1__42/Docs/R1-050795 zip)

[Non-Patent Literature 3] 3GPP Contribution, R1-050704, "Orthogonal Common Pilot Channel and Scrambling Code in Evolved UTRA Downlink" [Search Sep. 7, 2005], Internet (URL: ftp: //ftp.3gpp.org/TSG_RAN/WG1_RL1/TSGR1__42/Docs/R1-050704.zip)

[Non-Patent Literature 4] 3GPP Contribution, R1-050700, "Intra-Node B Macro Diversity Using Simultaneous Transmission with Soft-Combining in Evolved UTRADownlink" [Search Sep. 7, 2005], Internet (URL: ftp://ftp.3gpp.org/TSG_RAN/WG1_RL1/TSGR1__42/Docs/R1-050700.zip)

DISCLOSURE OF INVENTION

Problems to be Solved by the Invention

However, diversity such as the CDT diversity method and the soft-combining method is conventionally used separately from orthogonality of subcarriers for channel estimation between sectors, and there is a problem that simply combining them destroys orthogonality and leads to deterioration in the channel estimation precision.

The present invention has been made in view of the circumstances described above, and an object thereof is to make it possible to estimate the powers of respective transmitters, to provide a transmitter that transmits a channel estimation symbol that enables a channel to be precisely estimated, a transmitter that can transmit data in a format that does not require receive processing or an unnecessary sequence in soft-combining which transmits same data to a same terminal, a transmitter that can process those signals, an OFDM communication system, and a transmission method.

Means for Solving the Problems

A transmitter of the present invention has been realized to solve the above problems, and therefore provides a transmitter in a cellular system using an OFDM scheme, wherein the transmitter multiplies a subcarrier for channel estimation by a code and performs transmission, and the code is such that a phase difference $\phi$ between codes multiplied with consecutive subcarriers for channel estimation is constant, and codes of every M consecutive subcarriers, M being 2 or an integer greater than 2, are mutually orthogonal with codes multiplied with same subcarriers of another transmitter.

In the transmitter of the present invention, when the total number of subcarriers Nsub satisfies the condition of $2N-1<Nsub\leq 2N$, N being a natural number, $\phi$ is set so as to satisfy $\phi \times 2N = 2n\pi$, n being an integer, and M is set so as to be a submultiple of Nsub.

In the transmitter of the present invention, M=4, and $\phi$ is all or some of a set of 0, $\pi/2$, $\pi$, and $3\pi/2$.

In the transmitter of the present invention, codes allocated to four consecutive subcarriers are (1, 1, 1, 1), (1, j, −1, −j), (1, −1, 1, −1) and (1, −j, −1, j), j being an imaginary unit In the transmitter of the present invention, M=8, and $\phi$ is all or some of a set of 0, $\pi/4$, $\pi/2$, $3\pi/4$, $\pi$, $5\pi/4$, $3\pi/2$, and $7\pi/4$.

In the transmitter of the present invention, codes allocated to eight consecutive subcarriers are (1, 1, 1, 1, 1, 1, 1, 1), (1, (1+j)/√2, j, (−1+j)/√2, −1, (−1−j)/√2, −j, (1−j)/√2), (1, j, −1, −j, 1, j, −1, −j), (1, (−1+j)/√2, −j, (1+j)/√2, −1, (1−j)/√2, j, (−1−j)/√2), (1, −1, 1, −1, 1, −1, 1, −1), (1, (−1−j)/π2, j, (1−j)/√2, −1, (1+j)/√2, −j, (1−j)/√2), (1, −j, −1, j, 1, −j, −1, j), (1, (1−j)/√2, −j, (−1−j)/√2, −1, and (−1+j)/√2, j, (1+j)/√2), j being an imaginary unit.

Furthermore, a transmitter of the present invention is a transmitter in a cellular system using a base station that includes a plurality of sectors using an OFDM scheme, wherein the transmitter multiplies subcarriers for channel estimation by codes and performs transmission, the codes includes a first code and a second code, the first code is such that a phase difference $\phi$ between codes multiplied with consecutive subcarriers for channel estimation is constant, and codes of every M consecutive subcarriers, M being 2 or an integer greater than 2, are mutually orthogonal with a first code multiplied with same subcarriers of a transmitter of another sector, and the second code is a code unique to the base station.

A transmitter of the present invention is a transmitter in a cellular system using a base station that includes a plurality of sectors using an OFDM scheme, wherein the transmitter is provided in each of the sectors, and when allocating codes for creating OFDM symbols for channel estimation to respective subcarriers, and when allocating communication data to the respective subcarriers, if $\phi$ is a phase difference between codes multiplied with consecutive subcarriers for channel estimation, and if n is an arrangement spacing between the subcarriers for channel estimation, n being 1 or an integer larger than 1, a phase rotation of $(k-1) \times \phi/n$ is further added to a modulated phase of a kth subcarrier in every OFDM symbol, k being 1 or an integer larger than 1 and being equal to or smaller than the total number of subcarriers, and transmission is performed, and $\phi$ is unique to each of the sectors.

In the transmitter of the present invention, when a ratio between an effective OFDM symbol length and a guard interval length that is set is 1:G, the phase difference $\phi$ is set so as to satisfy $\phi \geq 2 \times G \times \pi$.

A transmitter of the present invention is a transmitter in the cellular system using the OFDM scheme, wherein the transmitter allocates the codes as recited in any one of claims 1 to 6 to the subcarriers for channel estimation and transmits as the subcarriers for channel estimation, and, if $\phi$ is the phase difference between the codes multiplied with the consecutive subcarriers for channel estimation, and if n is an arrangement spacing between the subcarriers for channel estimation, n being 1 or an integer larger than 1, the transmitter further adds a phase rotation of $(k-1) \times \phi/n$ to a modulated phase of a kth subcarrier in an OFDM symbol in which data is transmitted, k being 1 or an integer larger than 1 and being equal to or smaller than the total number of subcarriers.

A transmitter of the present invention is a transmitter in a cellular system using an OFDM scheme, wherein the transmitter multiplies codes that are orthogonal in M subcarrier units, M being 2 or an integer larger than 2, by a subcarrier unit and transmits as subcarriers for channel estimation, and when $\phi$ is a phase difference between codes multiplied with consecutive subcarriers for channel estimation, and if n is an arrangement spacing between the subcarriers for channel estimation, n being 1 or an integer larger than 1, the transmitter further adds a phase rotation of $(k-1) \times \phi/n$ to a modulated phase of a kth subcarrier in an OFDM symbol in which data is transmitted, k being 1 or an integer larger than 1 and being equal to or smaller than the total number of subcarriers, and performs transmission.

In the transmitter of the present invention, the phase rotation φ is applied to the OFDM symbol by rotating an output of an IFFT.

Furthermore, a transmitter of the present invention is a transmitter in a cellular system using an OFDM scheme for frequency and time division access, wherein the transmitter transmits a code where a phase difference φ between codes multiplied with consecutive subcarriers for channel estimation is constant, and codes of every M consecutive subcarriers, M being 2 or an integer greater than 2, are mutually orthogonal to codes multiplied with same subcarriers of another transmitter, to a receiver as subcarriers for channel estimation; and, if n is an arrangement spacing between the subcarriers for channel estimation, n being 1 or an integer larger than 1, when transmitting same data to a same receiver simultaneously in conjunction with the other transmitter using a same frequency band, the transmitter further adds a phase rotation of $(m-1) \times \phi/n$ to a phase of an mth subcarrier that is modulated with data, m being 1 or an integer larger than 1 and is equal to or smaller than the total number of subcarriers in a communication band, and performs transmission.

An OFDM communication system of the present invention includes a receiver which, when demodulating data transmitted from one transmitter, uses an FFT to frequency-convert an OFDM symbol that contains a received subcarrier for channel estimation, and estimates a channel that is a frequency response with the transmitter in units of the subcarrier for channel estimation, orthogonality of the subcarrier for channel estimation being maintained on a transmission side, and when demodulating same data transmitted from two or more transmitters, uses an FFT to frequency-convert the OFDM symbol that contains the received subcarrier for channel estimation, and multiplies the subcarrier for channel estimation by a complex conjugate of a code used in one of the transmitters to determine a combined channel from all the transmitters.

In the OFDM communication system of the present invention, the receiver includes a function of estimating the reliability of each transmitter from the orthogonality of a signal for channel estimation.

Furthermore, an OFDM communication system of the present invention includes: a receiver that uses an FFT to frequency-convert an OFDM symbol that contains a received subcarrier for channel estimation, determines a channel with the transmitter by multiplying the subcarrier for channel estimation by a complex conjugate of a code used at the transmitter, and performs an IFFT to perform conversion into an impulse response, and determines a base station or a sector or both of the base station and the sector based on a position where signal components are concentrated that is obtained from the converted result.

An OFDM communication system of the present invention includes a receiver that uses an FFT to frequency-convert an OFDM symbol that contains a received subcarrier for channel estimation, determines a channel with the transmitter by multiplying the subcarrier for channel estimation by a complex conjugate of a code used at the transmitter, and performs an IFFT to perform conversion into an impulse response, and extracts only a time where signal components are concentrated that is obtained from the converted result, and performs an FFT again to estimate the channel with a transmitter of a sector to be connected.

An OFDM communication system of the present invention includes a receiver that uses an FFT to frequency-convert an OFDM symbol that contains a received subcarrier for channel estimation, and determines a channel with the transmitter by multiplying the subcarrier for channel estimation by a complex conjugate of a code used at the transmitter.

An OFDM communication system of the present invention includes a receiver that includes a function of estimating the reliability of each transmitter from orthogonality of a signal for channel estimation.

An OFDM communication system of the present invention includes a receiver that, when receiving same data from a plurality of transmitters, calculates channels with the respective transmitters, and further calculates a combined channel when receiving data from the respective channels.

An OFDM communication system of the present invention includes a receiver that transmits control data of each slot, uses an FFT to frequency-convert an OFDM symbol that contains a received subcarrier for channel estimation, determines a channel with the transmitter by multiplying the subcarrier for channel estimation by a complex conjugate of a code used at the transmitter, further demodulates a slot to be received and control data for demodulating data relating to modulation from control data that has been received, and demodulates a data slot addressed to a self terminal.

A transmission method of the present invention is a method in a cellular system using an OFDM scheme, for multiplying a subcarrier for channel estimation by a code and performing transmission, wherein the code is such that a phase difference between codes multiplied with consecutive subcarriers for channel estimation is constant, and codes of every M consecutive subcarriers, M being 2 or an integer greater than 2, are mutually orthogonal with codes multiplied with same subcarriers of another transmitter.

A transmission method of the present invention is a method in a cellular system using a base station that includes a plurality of sectors using an OFDM scheme, for multiplying a subcarrier for channel estimation by codes and performing transmission, the codes including a first code and a second code, the first code being such that a phase difference between codes multiplied with consecutive subcarriers for channel estimation is constant, and codes of every M consecutive subcarriers, M being 2 or an integer greater than 2, are mutually orthogonal with a first code multiplied with same subcarriers of a transmitter of another sector; and the second code being unique to the base station.

A transmission method of the present invention is a method provided in each of a plurality of sectors in a cellular system using a base station that includes the sectors using an OFDM scheme, the method includes: when allocating codes for creating OFDM symbols for channel estimation to respective subcarriers, and when allocating communication data to the respective subcarriers, if φ is a phase difference between codes multiplied with consecutive subcarriers for channel estimation, and if n is an arrangement spacing between subcarriers for channel estimation, n being 1 or an integer larger than 1, further adding a phase rotation of $(k-1) \times \phi/n$ to a modulated phase of a kth subcarrier in every OFDM symbol, k being 1 or an integer larger than 1 and being equal to or smaller than the total number of subcarriers, and performing transmission; and φ being unique to each of the sectors.

A transmission method of the present invention is a method in a cellular system using an OFDM scheme, for allocating the codes as recited in claim 21 to the subcarriers for channel estimation and transmitting as the subcarriers for channel estimation, and, if φ is the phase difference between the codes multiplied with the consecutive subcarriers for channel estimation, and if n is an arrangement spacing between the subcarriers for channel estimation, n being 1 or an integer larger than 1, further adding a phase rotation of $(k-1) \times \phi/n$ to a modulated phase of a kth subcarrier in an OFDM symbol in which data is transmitted, k being 1 or an integer larger than 1 and being equal to or smaller than the total number of subcarriers.

A transmission method of the present invention is a method in a cellular system using an OFDM scheme, for multiplying codes that are orthogonal in M subcarrier units, M being 2 or an integer larger than 2, by a subcarrier unit and transmitting as subcarriers for channel estimation, and when $\phi$ is a phase difference between codes multiplied with consecutive subcarriers for channel estimation, and if n is an arrangement spacing between the subcarriers for channel estimation, n being 1 or an integer larger than 1, further adding a phase rotation of $(k-1) \times \phi/n$ to a modulated phase of a kth subcarrier in a OFDM symbol in which data is transmitted, k being 1 or an integer larger than 1 and being equal to or smaller than the total number of subcarriers, and performing transmission.

Effects of the Invention

In the present invention, subcarriers for channel estimation are multiplied by a code where the phase difference $\phi$ of the code multiplied with consecutive subcarriers for channel estimation is constant, and the code of every M consecutive subcarriers N being 2 or an integer greater than 2) is mutually orthogonal with a code multiplied with same subcarriers of another transmitter.

Therefore, mutual interference between the subcarriers for channel estimation can be prevented and channel estimation can be made more precise, increasing communication quality.

BRIEF DESCRIPTION OF THE DRAWINGS

FIG. 14A is an example of codes used in the present embodiment.

FIG. 14B is an example of codes used in the present embodiment.

FIG. 25A is a graph of a delay profile h1 expressing a channel between transmission antenna 1 and receive antenna 3 of the receiver in the time domain.

FIG. 25B is a graph of a delay profile h2 expressing a channel between transmission antenna 2 and receive antenna 3 of the receiver in the time domain.

FIG. 26 is an example of a signal received at receive antenna 3.

EXPLANATION OF REFERENCE NUMERALS

Figure 1:
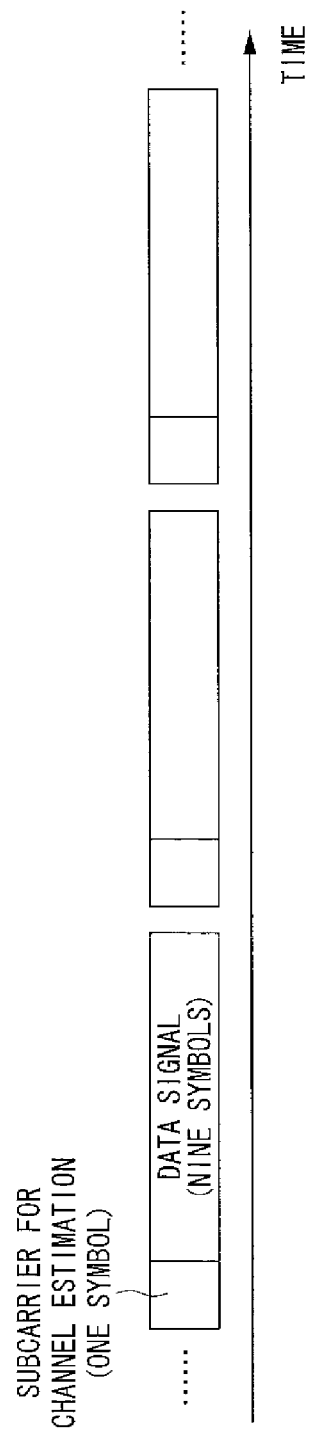
FIG. 1 is an example of a frame configuration that is a subject of the present embodiment.

Transmission antennas 1, 2
Reception antenna 3
Subcarrier for channel estimation creator 100
Controller 101
Error-correction coding units 102, 113, 124
Serial/parallel converters 103, 114, 125
Mapping units 104, 115, 126
Multiplex units 105, 116, 127
IFFT units 106, 117, 128
Parallel/serial converters 107, 118, 129
Switches 108, 119, 130
Time-shift units 109, 120, 131
GI insertion units 110, 121, 132
Digital/analog converters 111, 122, 133
Wireless transmission units 112, 123, 134
Antenna unit 135
Antenna unit 150
Wireless receiving unit 151
Analog/digital converter 152
Synchronization unit 153
GI removal unit 154

Serial/parallel converter 155
FFT unit 156
Subcarrier for channel estimation extractor 157
Code multiplication unit 158
Despread unit 159
Controller 160
Switch 161
Power calculation unit 162
Channel compensation unit 163
Error correction decoder 164
Multiplication unit 2101
IFFT unit 2102
Time filter unit 2103
FFT unit 2104
Complex conjugate unit 2105
Base station identification code creation unit 2106
Base station identification unit 2107
Sector controller 4201
Sector transmission unit 4202
Transmission sector antenna 4203
Transmission sector antenna 4205
Transmission antenna 4207
Receive sector antenna 4209
Sector receive unit 4210
Receive sector antenna 4211
Sector receive unit 4212
Receive sector antenna 4213
Error-correction encoding unit 4301
Mapping unit 4302
Subcarrier for channel estimation creation unit 4303
Switch unit 4304
Phase control unit 4305
IFFT unit 4306
Parallel/Serial converter 4307
CI insertion unit 4308
Digital/analog converter 4309
Wireless unit 4310
Receive antenna unit 4501
Wireless receive unit 4502
Analog/digital converter 4503
Synchronization unit 4504
Guard interval removal unit 4505
Serial/parallel converter 4506
Code selection unit 4509
Code multiplication unit 4510
Channel estimation unit 4511
Demap unit 4518
Data demodulation unit 4512
Sector power estimation unit 4513
Error correction unit 4514
Controller 4515
Uplink transmission unit 4516
Control data demodulation unit 4517

BEST MODE FOR CARRYING OUT THE INVENTION

Hereinafter, embodiments of the present invention will be explained with reference to the drawings.

First to fourth embodiments of the present invention describe an orthogonal frequency division multiple access (OFDMA) system where there are twelve frequency sub-channels, 768 subcarriers, and 1024 FFT points. Moreover, explanations are made of configurations of subcarriers for channel estimation and configurations of a transmitter and a receiver which are suitable when CDT diversity aimed at enhancing reception characteristics by increasing path diversity (frequency diversity) gain is performed at a base station functioning as a transmitter.

Incidentally, the first to fourth embodiments can be applied in an OFDM system instead of an OFDMA system.

(First Embodiment)

A first embodiment of the present invention will be explained first. The present embodiment describes a case where, with respect to signals transmitted from a plurality of transmission antennas (particularly in a plurality of sectors), switching is performed over time between application of CDT diversity (when transmitting same data from a plurality of sectors) and non-application of CDT diversity (when transmitting data that differs in all sectors).

FIG. 1 is an example of a frame configuration that is a subject in the present embodiment. As shown in the figure, the subject of the present embodiment is a frame having a total of ten symbols, including a subcarrier for channel estimation of one symbol appended at the head, and a data signal of nine symbols thereafter. It should be noted that all frequency subchannels in one frame transmitted from one sector are occupied by one user.

Figure 2:
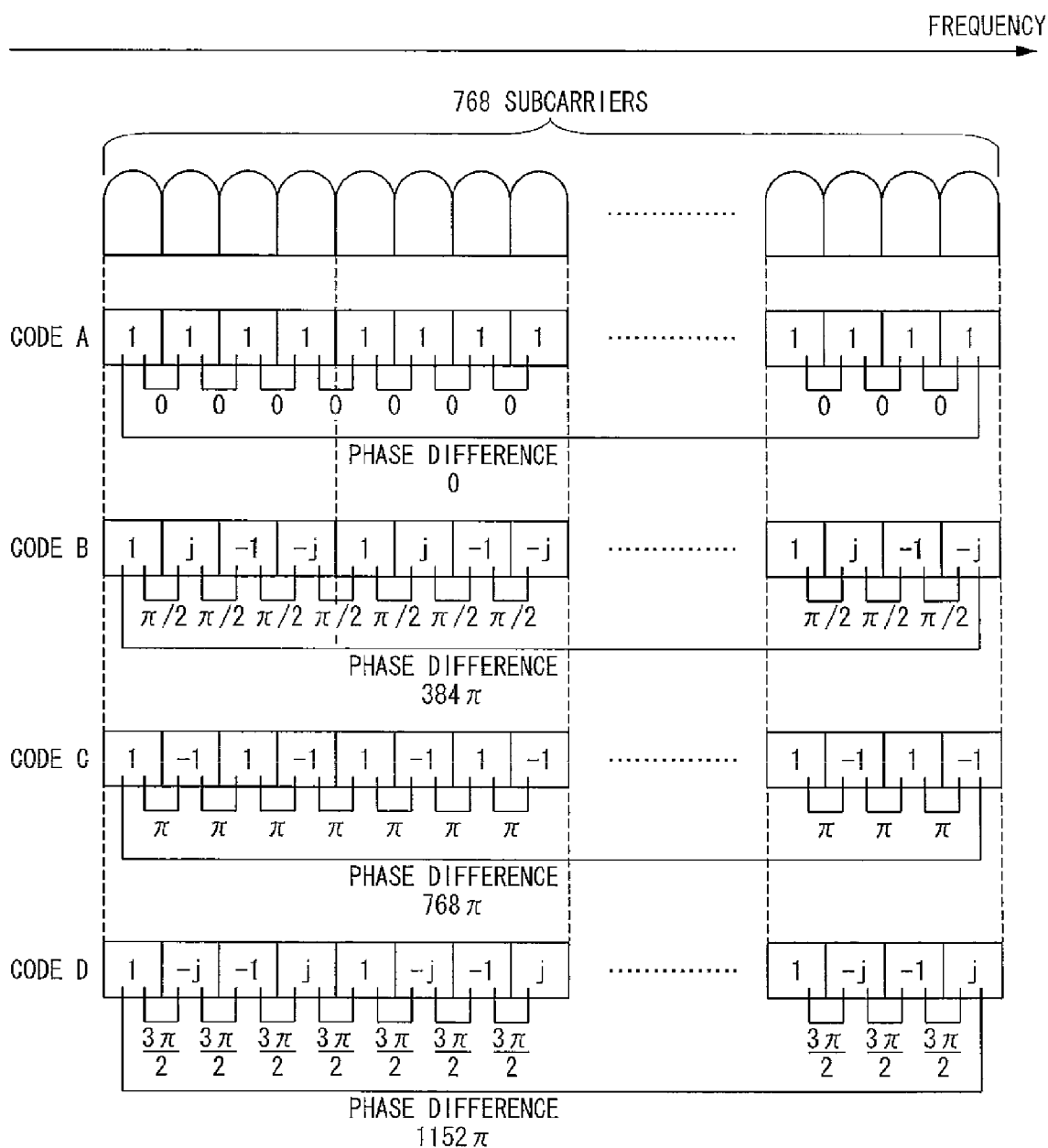
FIG. 2 is a diagram of codes used for subcarriers for channel estimation in the present embodiment.

FIG. 2 is a diagram of codes used for subcarriers for channel estimation in the present embodiment. As shown in the figure, the present embodiment uses codes created by repeating four-chip orthogonal codes A to D by the number of subcarriers (a code having a code length of 768 obtained after 192 repetitions of a four-chip code). By using codes A to D which are orthogonal every four chips, when frequency fluctuation is not severe, orthogonality can be maintained among a plurality of signals traveling along different channels, and channel fluctuation can be estimated without mutual interference. For each chip of the codes shown in FIG. 2, a constant phase rotation has been applied to its adjacent chips.

For example, code A in FIG. 2 is (1, 1, 1, 1), code B is (1, $j$, −1, −$j$), code C is (1, −1, 1, −1), and code D is (1, −$j$, −1, $j$), $j$ being an imaginary unit. That is, in code A, the phase difference between chips is 0 (or $2\pi$), in code B, $\pi/2$, in code C, $\pi$, and in code D, $3\pi/2$. That is, the phase difference $\phi$ of the code multiplied with the consecutive subcarriers for channel estimation is constant, and each code of every M consecutive subcarriers (M being 2 or an integer greater than 2) is mutually orthogonal to a code multiplied with same subcarriers of another transmitter. It should be noted that while the present embodiment uses all of $\phi=0$, $\pi/2$, $\pi$, $3\pi/2$, it is acceptable to use some of these phase differences.

In other words, when the total number of subcarriers Nsub satisfies the condition of $2^{N-1}<\text{Nsub}\leq 2^N$, it is acceptable that $\phi$ is set such that it satisfies $\phi \times 2^N = 2n\pi$ (where n is an integer), and M is set such that it is a submultiple of Nsub.

This phase difference between adjacent chips is maintained not only between the basic four chips, but also in a code of any length that is created by repeating those four chips.

In the present embodiment, which uses the codes A to D shown in FIG. 2 as subcarriers for channel estimation, a signal in which a constant phase rotation amount of $2\pi f\tau$ is added between chips (between subcarriers) (it should be noted that the phase rotation amount of all FFT points being an integral multiple of $2\pi$), becomes, after IFFT, a signal whose samples are temporally rotated by a value $\tau$ corresponding to the phase rotation amount, as shown below in equation (1). For example, since code A has zero phase difference between subcarriers, and code B has a phase difference of $\pi/2$, a signal obtained by performing an IFFT process to code B will be one that has temporally rotated the signal obtained by performing an IFFT process to code A by 256 samples (since the total phase rotation amount at 1024 FFT points is 2×256π. In other words, by rotating the IFFT output, the OFDM symbols can be given a phase rotation φ.

Similarly, a signal created when using code C is temporally rotated by 512 samples with respect to one using code A, and a signal created when using code D is temporally rotated by 768 samples with respect to one using code A. This is based on the characteristics of the Fourier transform shown below in equation (2), and this reversibility enables codes in the frequency domain to be created such as that shown in FIG. 2 by rotating the signal in the time domain.
(Formula 1)

$$s(f)e^{-2\pi f\tau} \Leftrightarrow s(t-\tau) \qquad (2)$$

Figure 3:
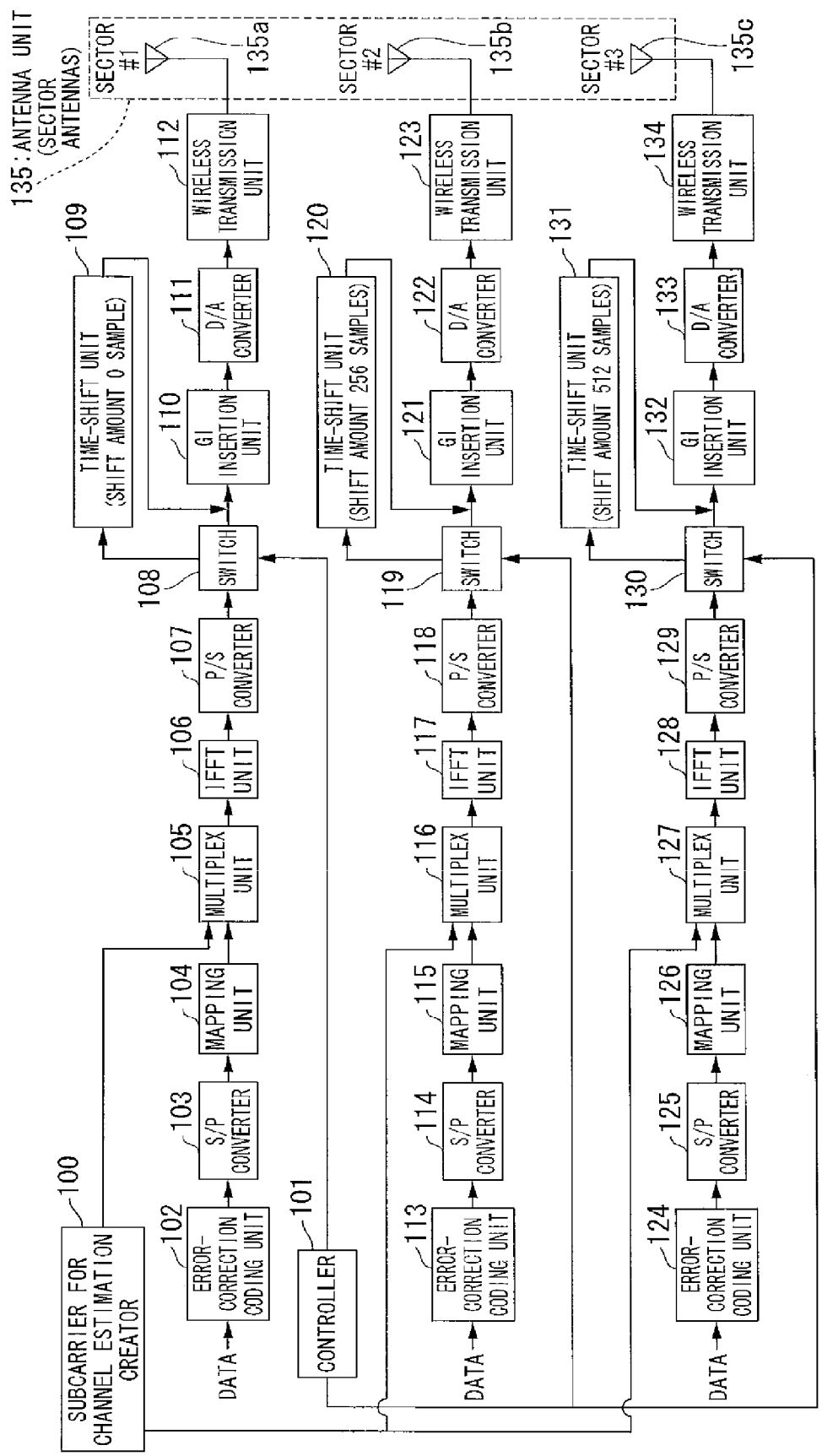
FIG. 3 is a block diagram of a configuration of a transmitter (base station) that performs CDT diversity.

FIG. 3 is a block diagram of the configuration of a transmitter (base station) that performs CDT diversity. This transmitter includes a subcarrier for channel estimation creator 100, a controller 101, error-correction coding units 102, 113, and 124, serial/parallel (S/P) converters 103, 114, and 125, mapping units 104, 115, and 126, multiplex units 105, 116, and 127, IFFT units 106, 117, and 128, parallel/serial converters 107, 118, and 129, switches 108, 119, and 130, time-shift units 109, 120, and 131, guard interval (GI) insertion units 110, 121, and 132, digital/analog (D/A) converters 111, 122, 133, wireless transmission units 112, 123, and 134, and an antenna unit 135.

By way of example, the present embodiment targets a cellular system including cells divided into three sectors; a base station functioning as a transmitter has three sector antennas 135*a* to 135*c* in the antenna unit 135, and there are respective three transmission systems.

In the subcarrier for channel estimation creator 100 of the transmitter shown in FIG. 3, subcarriers for channel estimation are created with all subcarrier signals at 1+0j (=1), and these are transmitted to the multiplex units 105, 116, and 127 of the respective transmission systems. At multiplex unit 105, the subcarrier for channel estimation created by the subcarrier for channel estimation creator 100 is multiplexed with a data signal that was error-correction encoded in error-correction coding unit 102, S/P converted by S/P converter 103, and mapped by the mapping unit 104.

While similar processes to those of the transmission system of sector antenna 135*a* are performed in the transmission systems of sector antennas 135*b* and 135*c*, when performing CDT diversity, a same data signal is input to a plurality of transmission systems that perform diversity combining, whereas, when not performing CDT diversity, different data signals are input to those transmission systems. It should be noted that since CDT diversity is usually applied when the receiver is near the edge of a sector (assuming the environment in which the cell is divided into sectors), the timing of switching between application/non-application is known in advance between the transmitter and the receiver (base station and terminal) by a means described later.

The signals obtained by multiplexing the subcarriers for channel estimation and the data signals in the multiplex units 105, 116, and 127 are subjected to an IFFT process and converted to time-domain signals in the IFFT units 106, 117, and 128 of the respective systems. The time-domain signals are P/S converted in the P/S converters 107, 118, and 129 of the respective systems, and input to the switches 108, 119, and 130. The switches 108, 119, and 130 are controlled by the controller 101, which, when not performing CDT diversity, inputs the P/S converted data signals to the GI insertion units 110, 121, and 132 and, when performing CDT diversity, inputs the P/S converted data signals to the time-shift units 109, 120, and 131. It should be noted that the switch timing of application/non-application of CDT diversity is known to the controller 101. While the destinations to which the data signals are input are switched in accordance with application/non-application of CDT diversity, the subcarriers for channel estimation are always input to the time-shift units 109, 120, and 131. Therefore, the switches 108, 119, and 130 of the respective systems have a function of separating the subcarriers for channel estimation and the data signals during non-application of CDT diversity. (Although time-shift unit 109 for sector #1 and the like are shown in FIG. 3 to simplify explanation, since the time-shift amount of time-shift unit 109 for sector #1 is 0, time-shift unit 109 need not be provided; the same goes for switch 108.)

The respective subcarriers for channel estimation and the data signals for application of CDT diversity are respectively input via the switches 108, 119, and 130 of the respective transmission systems to the time-shift units 109, 120, and 131, and time-shifted (rotated).

Figure 4:
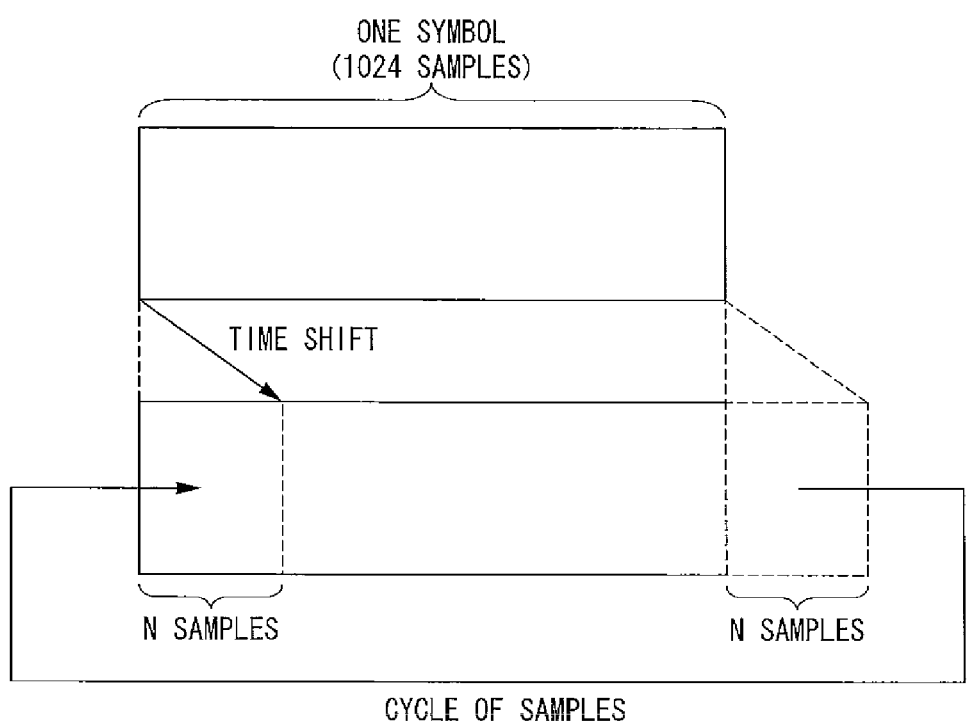
FIG. 4 is an explanatory diagram of processes in time shift units 109, 120, and 131 (FIG. 3).

FIG. 4 is an explanatory diagram of processes in the time-shift units 109, 120, and 131 (FIG. 3). As shown in the figure, the time-shift units 109, 120, and 131 shift (rotate) the time-domain signals input to them by N samples per symbol. In the present embodiment, at the transmitter that is the base station, this time shift is executed with different numbers of samples for the transmission systems of respective sectors such that sector #1 has 0 samples, sector #2 has 256 samples, and sector #3 has 512 samples.

While this time shift is performed to both the subcarriers for channel estimation and the data signals during CDT diversity application, concentrating in particular here on the subcarriers for channel estimation, even though all the subcarriers for channel estimation that are input to the multiplex units 105, 116, and 127 of the respective sectors have the same code (a signal where all subcarriers are set to 1), the time shift creates the same signals as when different codes are used in the frequency domain. For example, a time shift of 256 samples is executed at the time-shift unit 120 of sector #2 (FIG. 3), which is the same signal as that obtained by performing an IFFT process to code B of FIG. 2.

A time shift of 512 samples is executed at the time-shift unit 131 of sector #3 (FIG. 3), which creates the same signal as that obtained by performing an IFFT process to code C of FIG. 2. Since the time shift amount of sector #1 is set to 0, the signal is not shifted, making it the same as the signal obtained by performing an IFFT process to code A. As already mentioned, the four codes A to D shown in FIG. 2 are mutually orthogonal, and the signals of respective sectors #1 to #3 are orthogonal in the frequency domain. Therefore, by setting the time-shift units 109, 120, and 131 to different time-shift amounts for the respective sectors #1 to #3, and executing shift processes of the signals in the time domain, it becomes possible to create subcarriers for channel estimation where orthogonality is maintained for respective sectors in the frequency domain.

By transmitting such subcarriers for channel estimation, it is possible to precisely estimate, on the receiving side, the channels followed by the signals transmitted from the respective sectors #1 to #3. It should be noted that to create the same signals as those obtained by performing an IFFT to the orthogonal codes A to D as shown in FIG. 2, time shift amounts differing by 256 samples for the respective sectors must be set.

Concentrating on the data signal, when performing CDT diversity, same data signals are input to the transmission systems of the plurality of sectors #1 to #3, and signals that are delayed within the symbols can be created by using time shifts. By transmitting same data signals having different delay amounts for each of the sectors #1 to #3, on the receiver side, delay paths appear to have increased in the channels, enhancing the path diversity effect.

Signals subjected to different time-shifts by the time-shift units 109, 120, and 131 of the respective sectors have GIs appended to them by the GI insertion units 110, 121, and 132, are converted to analog signals by the D/A converters 111, 122, and 133, are frequency-converted by the wireless transmission units 112, 123, and 134 to frequencies capable of wireless transmission, and are transmitted from the sector antennas 135a to 135c of the respective sectors.

The foregoing configuration of the base station enables signals to be transmitted while maintaining orthogonality of the subcarrier codes for channel estimation, which cannot be maintained by conventional techniques, while also achieving a desired path diversity effect when performing CDT diversity.

Figure 5:
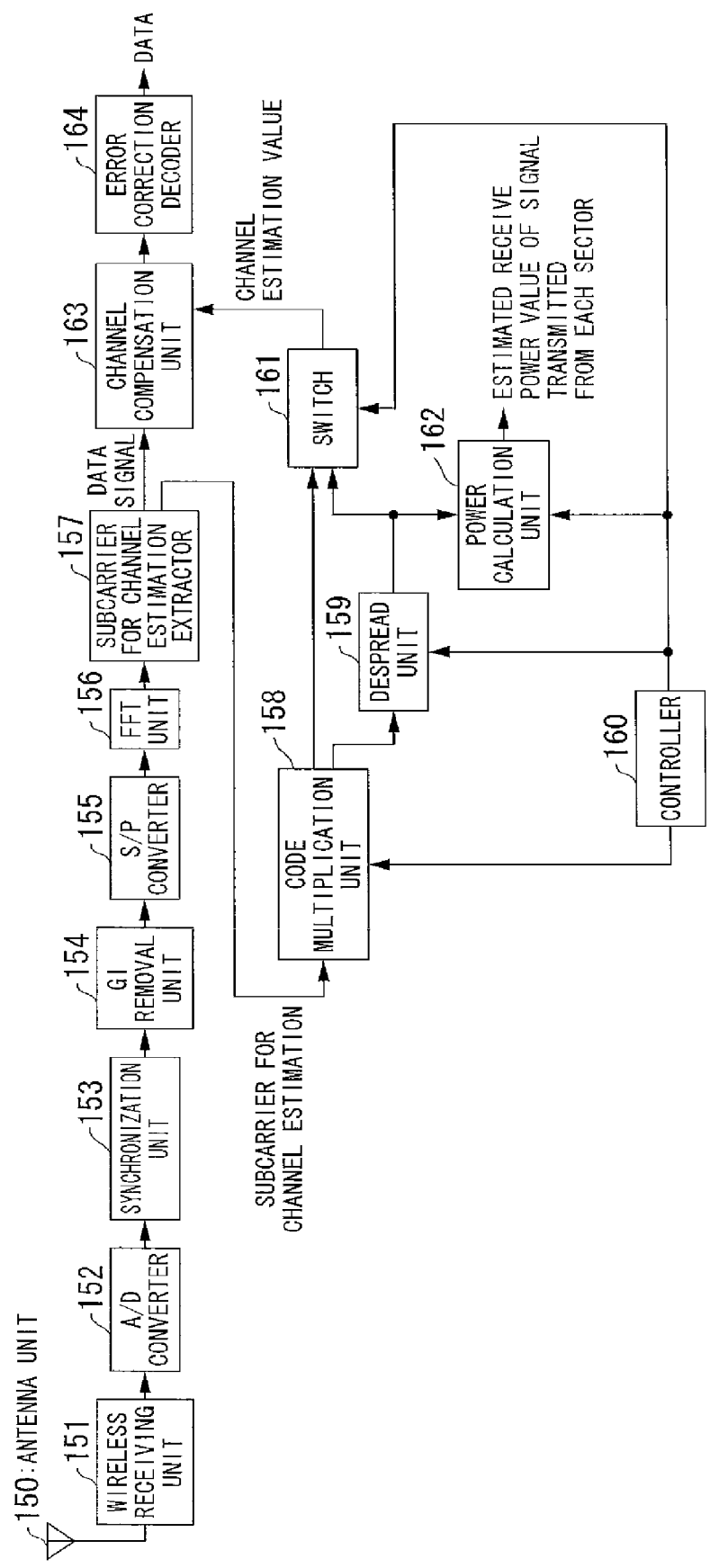
FIG. 5 is a block diagram of a configuration of a receiver in the present embodiment.

FIG. 5 is a block diagram of a configuration of a receiver in accordance with the present embodiment. The receiver includes an antenna unit 150, a wireless receiving unit 151, an A/D converter 152, a synchronization unit 153, a GI removal unit 154, an S/P converter 155, an FFT unit 156, a subcarrier for channel estimation extractor 157, a code multiplication unit 158, a despread unit 159, a controller 160, a switch 161, a power calculation unit 162, a channel compensation unit 163, and an error correction decoder 164.

A received signal received by the antenna unit 150 shown in FIG. 5, is frequency-converted by the wireless receiving unit 151 to an A/D-convertible frequency, and conversion into a digital signal is performed by the A/D converter 152. Then the synchronization unit 153 establishes symbol synchronization, the GI removal unit 154 removes the GI, whereafter S/P conversion is performed and is input to the FFT unit 156. The FFT unit 156 performs an FFT process, converting the received signal in the time domain to a signal in the frequency domain.

Subsequently, the subcarrier for channel estimation extractor 157 separates the subcarrier for channel estimation appended at the head of the frame and the data signal, sending the subcarrier for channel estimation to the code multiplication unit 158 and the data signal to the channel compensation unit 163. The subcarrier for channel estimation input to the code multiplication unit 158 is multiplied with a complex conjugate of the code in the frequency domain used on the transmitter side (the communicating sector) (in the present embodiment, one of codes A, B, and C; it should be noted that in the transmitter of FIG. 3, these codes are created by sample shift processing in the time domain).

Here, when not performing CDT diversity, there is one communicating sector, and the code multiplication unit 158 performs multiplication of a complex conjugate of the code transmitted from relevant sector with the received subcarrier for channel estimation (e.g. at the receiver communicating with sector #2, a complex conjugate of code B is multiplied). On the other hand, when performing CDT diversity, there are usually two communicating sectors; in this case, the code multiplied with the receive subcarrier for channel estimation at the code multiplication unit 158 can be either of the codes used in these sectors (e.g., when making a CDT diversity transmission from sectors #2 and #3, the code multiplication unit 158 performs multiplication using a complex conjugate of either one of code B and code C).

While either of the codes used in the two sectors can be used at this time, since CDT diversity is normally applied to a receiver which has moved near the edge of a sector, one selection method is to select the code used in the sector that was performing communication prior to application of CDT diversity. The code used at this time is specified by the controller 160. When CDT diversity is performed, the output from the code multiplication unit 158 expresses a channel estimation value of the received signal. When CDT diversity is performed, signals transmitted from two sectors are received; due to the nature of CDT diversity, these signals will be received with the delay path increased for one of these signals, enabling the channel estimation value to be determined by a general channel estimation method of multiplying the complex conjugate of the code used on the transmitter side.

The receive subcarrier for channel estimation (channel estimation value when CDT diversity is performed) multiplied by the complex conjugate of the code at the code multiplication unit 158 is sent to the despread unit 159 and the switch 161. The despread unit 159 calculates a channel estimated value when CDT diversity is not being performed. Specifically, it integrates respective chips multiplied by a complex conjugate of the code used in the transmitter side (this process being performed by the code multiplication unit 158) every four chips, and calculates an average of these to obtain a channel estimation value for every four chips (four subcarriers). Since the codes (codes A to C) used in the present embodiment are orthogonal every four chips as mentioned already, the integration process of the despread unit 159 can calculate a channel estimation value of a signal that a desired code is used in, even when the signals using the respective codes are mixed. The output of the despread unit 159 is sent to the switch 161 and the power calculation unit 162.

The power calculation unit 162 determines a square mean of the despread signals, and calculates the power of the received signal. Since codes used in the present embodiment are orthogonal to each other, the despread codes do not contain interference components transmitted from other sectors, making it possible to calculate the receive power of a signal transmitted from one sector. Here, when desiring to determine the receive powers of signals arriving from a plurality of sectors including ones that are not communicating, the code multiplication unit 158 separately performs processes of multiplying the receive signal and complex conjugates of respective codes used in the sectors, the despread unit 159 integrates the respective results, and inputs them to the power calculation unit 162. Selection of a sector (selection of a code) that transmitted a signal whose receive power is to be calculated, and the like, is controlled by the controller 160. Moreover, when processes of the despread unit 159 and the power calculation unit 162 are not required, power consumption can be reduced by stopping those circuits; the controller 160 also controls the ON/OFF of these circuits. The receive signal power value obtained here can be used as a reference for switching the application/non-application of CDT diversity (e.g., when the receive power of a signal from one sector is noticeably higher than that from another sector, CDT diversity is not applied, whereas, when two signals of approximately equal receive power are received, CDT diversity is applied, assuming that when the receiver is near the center of the sector, and when the receiver is near the edge of the sector).

The output of the code multiplication unit 158 and the output of the despread unit 159 are input to the switch 161, these outputs respectively expressing a channel estimation value when CDT diversity is performed, and a channel estimation value when CDT diversity is not performed; the switch 161 is switched such that, when CDT diversity is being performed, the input from the code multiplication unit 158 is sent to the channel compensation unit 163, and when CDT diversity is not being performed, the input from the despread unit 159 is sent to the channel compensation unit 163. The switch timing here is specified by the controller 160.

In this way, the channel estimation value is input to the channel compensation unit 163, where the data signal is subjected to channel compensation. After channel compensation, the data signal is sent to the error correction decoder 164, which performs error correction decoding and reproduces the transmitted data.

As described above, the receiver in accordance with the present embodiment estimates channel data by different methods depending on the number of transmitter (the number of sector antennas 135a to 135c (FIG. 3) provided in the transmitter).

The foregoing receiver can make a precise channel estimation with a simple configuration, irrespective of whether CDT diversity is being applied or not, and can obtain a desired path diversity effect when CDT diversity is performed.

While the present embodiment describes an example using three codes (codes A to C) from among the four codes (codes A to D) shown in FIG. 2, instead of this combination, any three of the four codes can be selected and used. Moreover, in a system with four sectors, all four codes could be used.

Also, while the four codes shown in the present embodiment are obtained by time-shifting a signal subjected to IFFT by 0 samples, 256 samples, 512 samples, and 768 samples on the transmitter side, these are not the only codes that maintain orthogonality when using the configurations of the transmitter and the receiver of the present embodiment, and it is also possible to use codes that are set such that the phase rotation amount between the subcarriers (chips) becomes a integral multiple of $\pi/2$. This obtains a combination of codes obtained by time-shifts of integral multiples of 256 samples in the time domain (e.g., a combination of four codes where the time shift amount is [1, 257, 513, 769], or a combination of four codes where the time shift amount is [100, 356, 612, 868], etc.). By using respective codes of such combinations in the respective sectors, orthogonality between the sectors can be maintained, and a path diversity effect can be obtained by applying CDT diversity using a simple configuration.

(Second Embodiment)

Subsequently, a second embodiment of the present invention will be explained. Respective parameters of the OFDM signals used in explanation of the present embodiment are the same as those used in the first embodiment.

Figure 6:
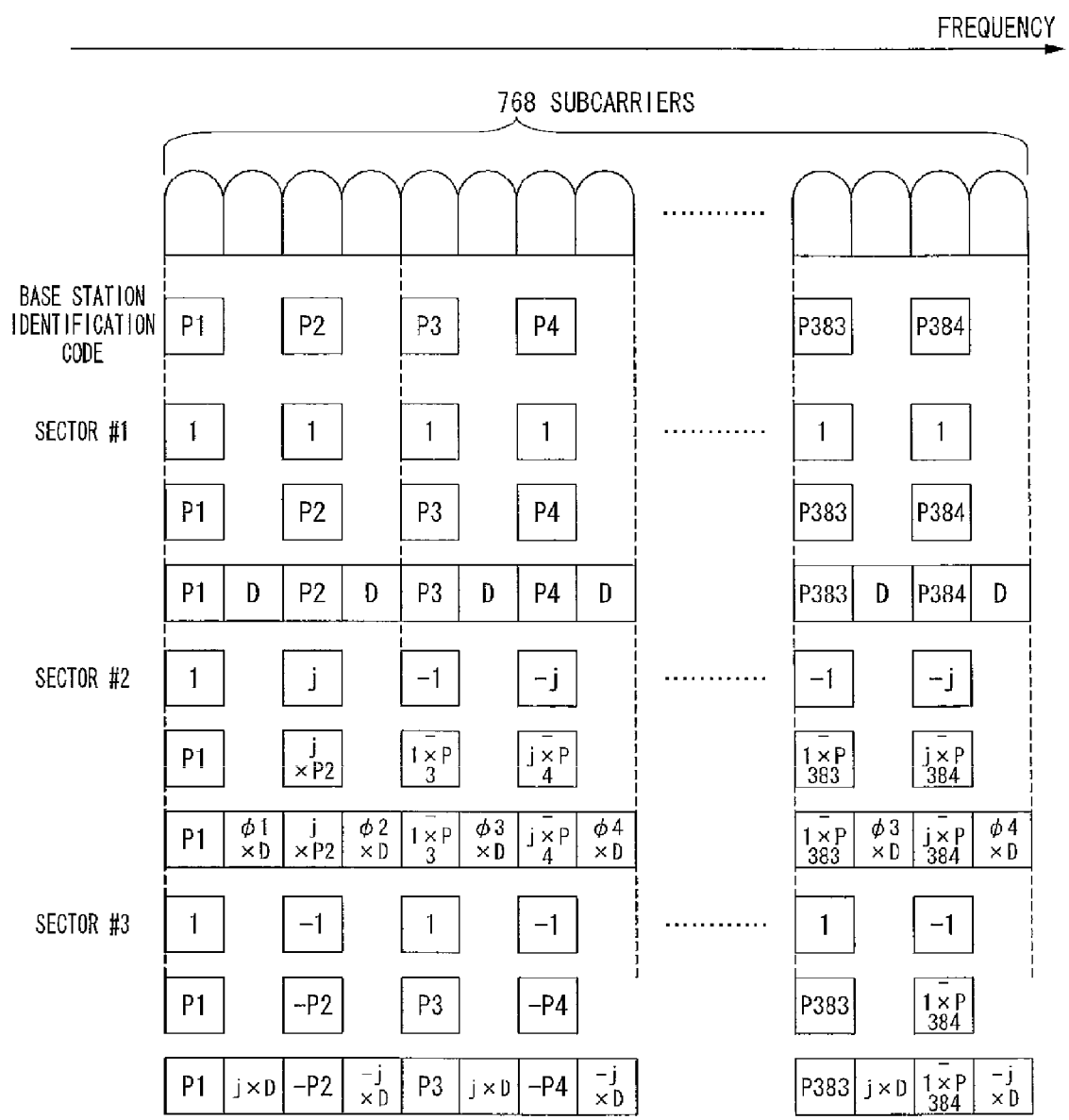
FIG. 6 is a diagram of patterns of subcarriers for channel estimation used in explanation of the present embodiment.

FIG. 6 is a diagram showing patterns of subcarriers for channel estimation used in explanation of the present embodiment. In the present embodiment, subcarriers for channel estimation are allocated to every other subcarriers, subcarriers to which subcarriers for channel estimation are not allocated being used in normal data communication. The base stations that function as the transmitters control three sectors, and three codes are allocated to respective sectors.

Codes allocated to the subcarriers for channel estimation will be explained using FIG. 6. In considering a cellular system, in the present embodiment, base station identification codes that are unique for respective base stations are allocated to the respective base stations that function as transmitters to identify them. The base station identification codes are then allocated to the subcarriers for channel estimation. In FIG. 6, these base station identification codes are denoted by P1 to P384.

Subsequently, as shown in the first embodiment, since each transmitter forms three sectors, codes for identifying the sectors must be allocated. The base station identification codes are therefore multiplied by the same codes as those used in the first embodiment. (Codes A to C of FIG. 2 are used.) The codes thereby obtained are OFDM symbols used as subcarriers for channel estimation for respective sectors, the codes being different for each of the three sectors.

Lastly, data is allocated to subcarriers that subcarriers for channel estimation are not allocated to. It should be noted that to simplify the circuit configurations of the transmitters, phase rotation is also given to the data, with a constant amount of phase rotation between adjacent subcarriers. In FIG. 6, the phase rotation amount is 0 in sector #1, $\pi/4$ in sector #2, and $\pi/2$ in sector #3. In FIG. 6, D denotes data. It should be noted that this does not mean that the same data D is allocated to all subcarriers.

It should be noted that in the present embodiment, first and second codes can be used. The phase difference $\phi$ of a first code multiplied by consecutive subcarriers for channel estimation is constant, and the first code of every M consecutive subcarriers M being 2 or an integer greater than 2) is orthogonal to a first code multiplied by same subcarriers of a transmitter of another sector, and a second code is unique to the base station.

Figure 7:
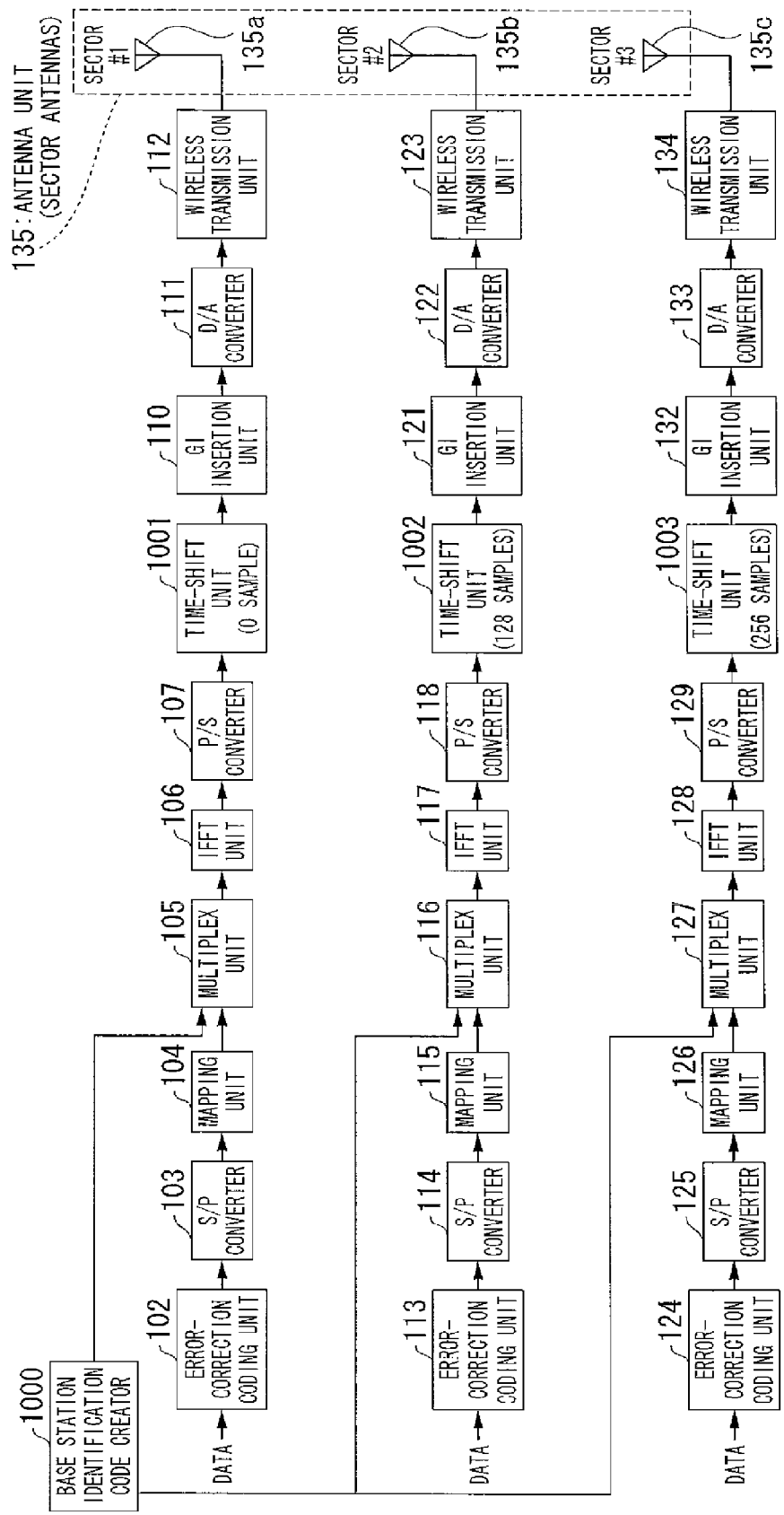
FIG. 7 is a block diagram of a configuration of a transmitter in the present embodiment.

FIG. 7 is a block diagram of the configuration of a transmitter in the present embodiment. Like reference numerals are appended to blocks that have like functions to those shown in FIG. 3, and explanation thereof is omitted. FIG. 3 and FIG. 7 differ in that FIG. 7 does not include a controller 101 that controls whether to use time-shift units, nor controlled switch units 106, 119, and 130, the subcarrier for channel estimation creator 100 is replaced by a base station identification code creator 1000, and the time-shift amounts of the time-shift units are different. (As in the first embodiment, although time-shift unit 1001 is not required since its shift amount is 0, it is provided in order to facilitate comparison with other configurations.) When creating subcarriers for channel estimation, multiplex units 105, 116, and 127 arrange a base station identification code created by the base station identification code creator 1000 and data on every other subcarrier.

The reason that the time shift amounts are different even though the codes of the subcarriers for channel estimation are not different is that subcarriers for data communication are inserted between the subcarriers for channel estimation, thereby substantially altering the phase rotation amounts between adjacent subcarrier. In comparison with the first embodiment, the phase rotation amount is ½ and the time-shift amount is also ½.

The shift amounts of time-shift units 1001, 1002, and 1003 are 0, 128, and 256, thereby obtaining subcarriers for channel estimation with modulated phases and amplitudes as shown in FIG. 6.

Configuring the transmitter using these codes for channel estimation obtains the following advantages.

Similar to that of the first embodiment, a first advantage is that powers of radio waves arriving from sectors can be measured separately due to the orthogonality of the codes for channel estimation, enabling accurate selection of sectors to be connected. A second advantage is that, while in the first embodiment, the time-shift units 109, 120, and 131 must be controlled at the timings of the subcarriers for channel estimation or the CDT diversity, in the present embodiment that necessity can be eliminated. A third advantage is that even if the receiver is not notified of the timing of performing CDT diversity, it can demodulate a signal having enhanced characteristics. That is, data can be demodulated by the same process when CDT diversity is performed and when CDT diversity is not performed. A fourth advantage is that a base station functioning as a transmitter can be speedily detected by adjusting the configuration of the receiver.

Of these four advantages, the first advantage is similar to that of the first embodiment, and the second advantage is obvious from the configuration of the transmitter. The third and fourth advantages will be explained with reference to the configuration of the receiver.

Since time shifts of 0, 128, and 256 samples are applied at the transmitters, if OFDM symbols for data communication are considered in conversion to those in the frequency domain, this signifies that transmit data is multiplied by codes of (1, 1, 1, 1, 1, 1, 1, 1), (1, $(1+j)/\sqrt{2}$, j, $(-1+j)/\sqrt{2}$, −1, $(-1-j)/\sqrt{2}$, −j, $(1-j)/\sqrt{2}$), and (1, j, −1, −j, 1, j, −1, −j) every eight subcarriers.

Here, CAk is a code in sector A of the kth subcarrier, H1$k$ is a response between the transmitter and the receiver at a frequency of that subcarrier, CBk is a code in sector B in a same subcarrier, H2K is a response between the transmitter and the receiver at the frequency of that subcarrier, and Pk is a code unique to the base station that is allocated to that subcarrier (Pk having a magnitude of 1). Also, Dk is data transmitted using that subcarrier.

In this case, the sum of CAk×Pk×H1$k$ and CBk×Pk×H2$k$, i.e., Pk (CAk×H1$k$+CBk×H2$k$) is received as the subcarrier for channel estimation. On the other hand, data of CAk×Dk×H1$k$ and CBk×Dk×H2$k$, i.e., Dk (CAk×H1$k$+CBk×H2K) is received as data symbols. Since the former, i.e., Pk, is already known, (CAk×H1$k$+CBk×H2$k$) is determined by multiplying by Pk* (where * denotes a complex conjugate). Dk can be determined by multiplying the received data value by this complex conjugate. When a radio wave cannot be received from sector B, we can consider this as H2$k$=0, whereby normal reception and reception of combined waves by CDT diversity can be performed by exactly the same reception process, and the benefit of path diversity effect can be achieved at the receiver.

The present embodiment describes an example where the subcarriers for channel estimation are arranged at every other subcarrier. In this case, the channel of the subcarrier in between can be determined by linear approximation from the channel data of its adjacent subcarriers.

Another method is to solve a linear equation with two unknowns from data of adjacent subcarriers. For example, when desiring to determine the channel of the nth subcarrier, assuming that H1($k$−1) and H2($k$=1) are equal to H1$k$ and H2$k$ respectively, since the codes are already known, the channel can be determined from the channel data of its adjacent subcarriers {CA(k−1)×H1($k$−1)+CB(k−1)×H2($k$−1)} and {CA(k+1)×H1($k$+1)+CB(k+1)×H2($k$+1)}. This assumption is correct for some channels, and is established without problem in a system such as that of the present embodiment, where sectors are identified by multiplying orthogonal codes by a plurality of subcarriers.

For H1$k$ and H2$k$ thus determined, a combined channel of the kth subcarrier can be determined from the codes CAk and CBk, which are multiplied by the subcarrier desiring to be determined.

Figure 8:
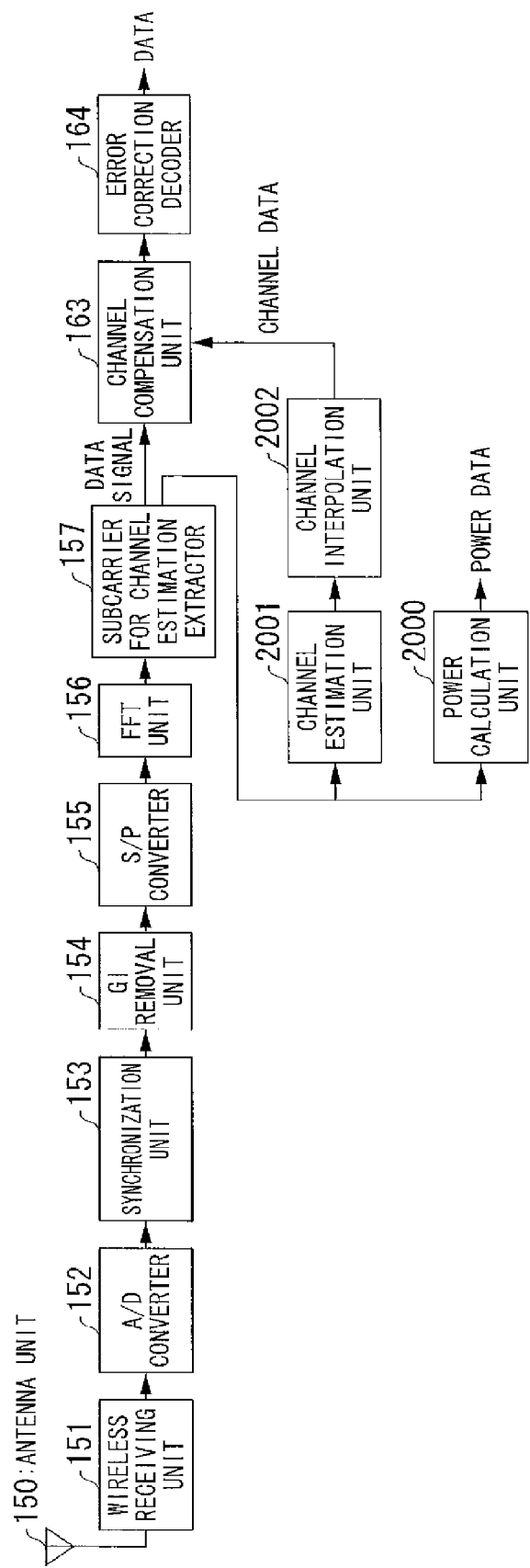
FIG. 8 is a block diagram of a configuration of a receiver in the present embodiment.

FIG. 8 is a block diagram of the configuration of the receiver in the present embodiment. Parts that are the same as those in the configuration of the receiver shown in FIG. 5 are denoted by like reference numerals, and explanation thereof is omitted. In FIG. 8, a power calculation unit 2000 calculates power from each sector where necessary. Using another line, the calculated data is notified to the base station functioning as the transmitter. Based on the notified power, the base station determines via which sector it will communicate with the receiver, and whether it will transmit data from a plurality of sectors using a technique such as CDT diversity.

On the other hand, at the receiver, the subcarrier for channel estimation extractor 157 extracts OFDM symbol for channel data estimation from the received signal, and a channel estimation unit 2001 calculates channel data based on the principle described above. From a determined channel method, a channel interpolation unit 2002 interpolates channel data relating to the position of a subcarrier having no subcarrier for channel estimation. Channel data of the entire OFDM signal band is thereby calculated, and data of subsequent OFDM symbols can be demodulated.

Subsequently, base station identification will be explained.

When using a code unique to the base station as the code for channel estimation as in the present embodiment, a connection procedure is required to detect a base station identification code, which is the code unique to the base station, from a received wave. Normally, a complex multiplication is performed to the output of each subcarrier of a received OFDM symbol and the base station identification code, added for all the subcarriers, and a correlation is detected if the code matches, whereby the base station can be identified.

However, when a code is further multiplied for each sector as in the present embodiment, this correlation process requires that three similar operations must be performed to the allocated base station identification code in order to identify the base station.

Accordingly, the configuration of a receiver will be explained that does not require three similar operations to identify a base station, even when using the code shown in the present embodiment as a sector identification code, and configuring the transmitter as shown in the present embodiment.

In this case, in the configuration of the receiver shown in FIG. 8, the configuration of the channel estimation unit 2001 differs from the configuration of the receiver of FIG. 5.

Figure 9:
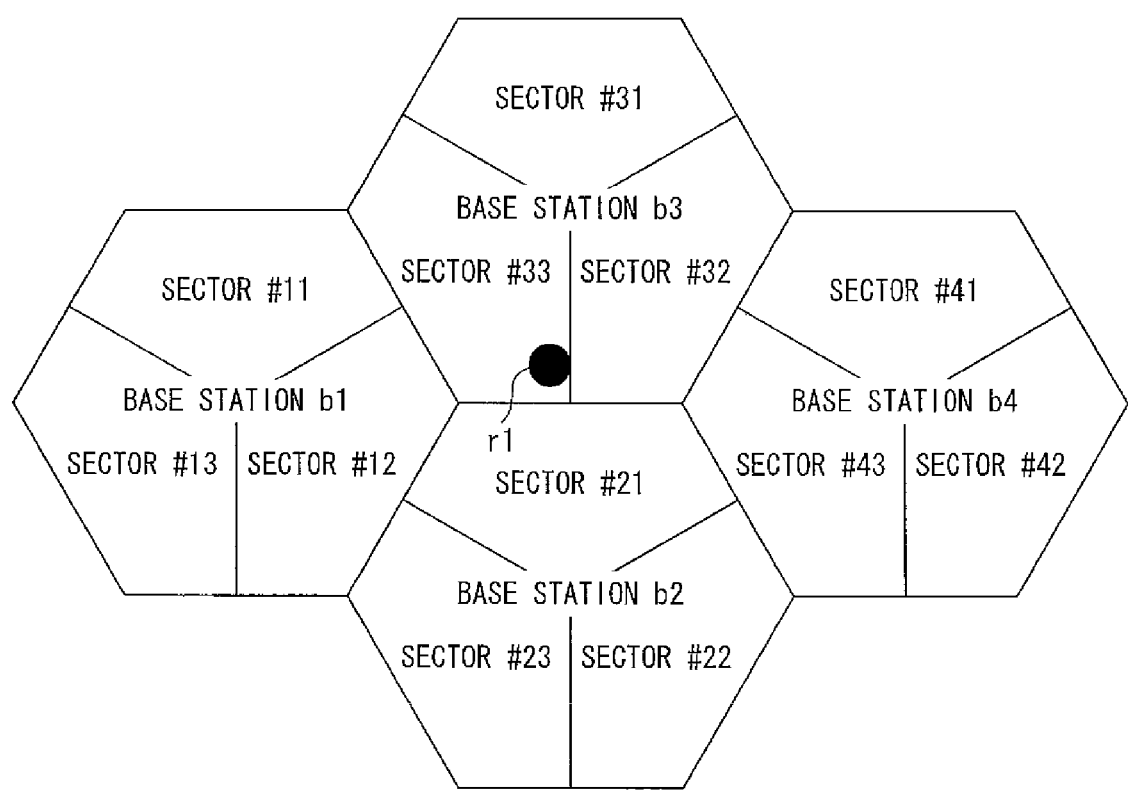
FIG. 9 is an example of a cell configuration, a sector configuration, and positions of mobile stations.

FIG. 9 is an example of a cell configuration, sector configurations, and positions of mobile station. In the figure, base station identification codes are allocated to base stations b1 to b4, and unique delay amounts shown in the present embodiment are applied to every three sectors #11 to #13, sectors #21 to #23, sectors #31 to #33, and sectors #41 to #43 belonging to the respective base stations b1 to b4. Here, a delay of 0 samples is applied to sectors #11, #21, #31, and #41, 128 samples to sectors #12, #22, #32, and #42, and 256 samples to sectors #13, #23, #33, and #43.

A receiver r1 functioning as a mobile station is located at a point on the sector #33 side of a sector edge forming the interface between sectors #32 and #33 of base station b3. This point is a region that receives radio waves from sector #21 of base station b2 as interference.

Figure 10:
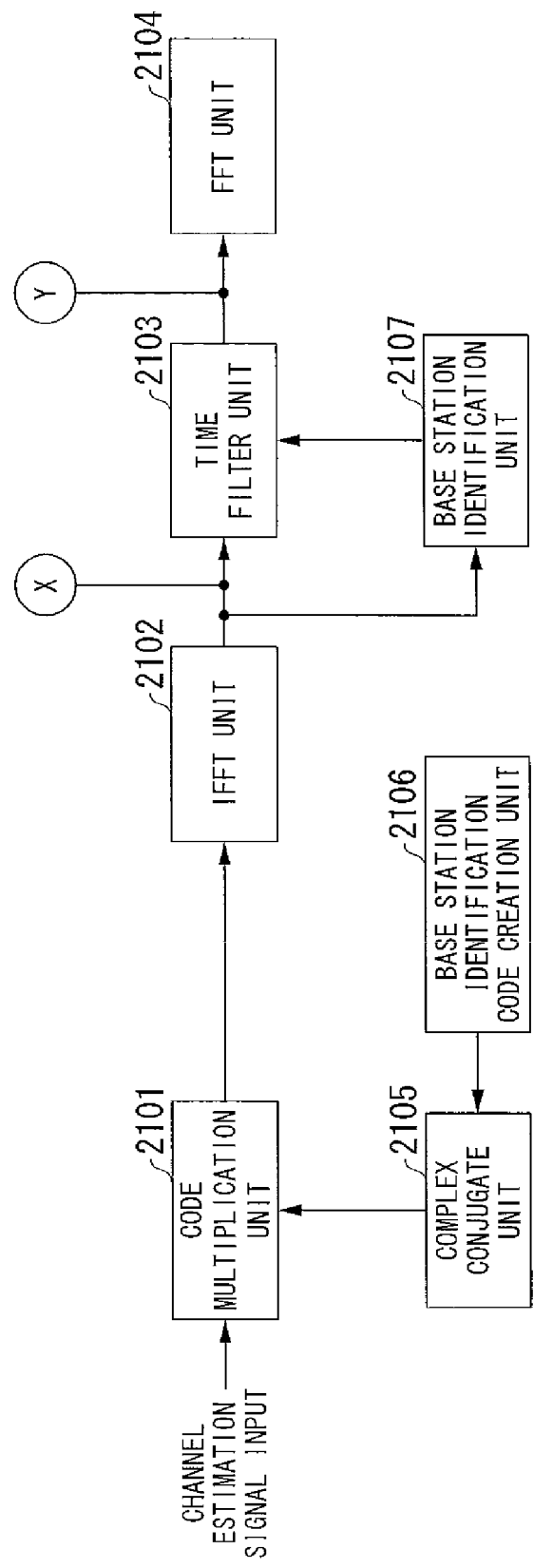
FIG. 10 is a block diagram showing the details of a channel estimation unit 2001 (FIG. 8).

FIG. 10 is a block diagram showing the details of the channel estimation unit 2001 (FIG. 8). The channel estimation unit 2001 includes: a multiplication unit 2101 that multiplies a received signal for channel estimation and a complex conjugate signal of the base station identification code; an IFFT unit 2102 that converts a frequency waveform to a time waveform; a time filter unit 2103 that removes noise; an FFT unit 2104 that converts a time waveform back to a frequency waveform; a complex conjugate unit 2105 that calculates a complex conjugate of a code; a base station identification code creation unit 2106 that creates a base station identification code that is unique to a base station; and a base station identification unit 2107 that determines a base station or sector for connection, and a base station or sector for handover.

When the mobile station that is the receiver starts connection, it identifies a base station to connect to. At this time, the simplest method is to sequentially check possible codes. Therefore, the base station code creation unit 2106 shown in FIG. 10 creates a base station identification code for base station b1, and the base station identification unit 2107 identifies the signal.

Figure 11:
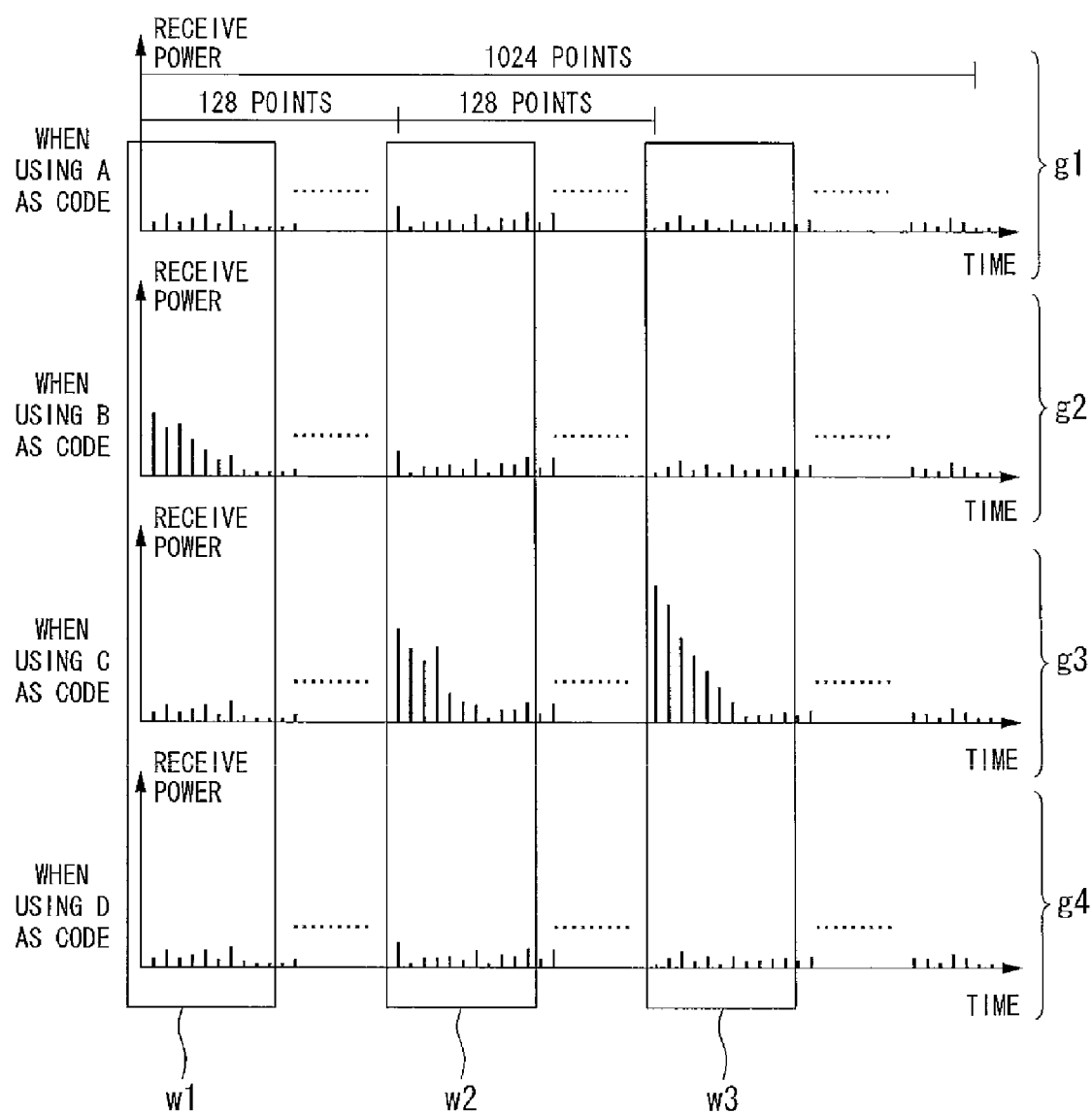
FIG. 11 is a graph of waveforms of signals identified by a base station identification unit 2107 (FIG. 10).

FIG. 11 is a graph showing waveforms of signals identified by the base station identification unit 2107 (FIG. 10). Graphs g1 to g4 respective show the cases where A to D are allocated as base station identification codes.

Rectangular regions w1 to w3 in FIG. 11 are areas where the base station identification unit 2107 (FIG. 10) measures power. Since OFDM symbol synchronization is not perfect, the rectangular regions w1 to w3 are set with a certain degree of margin, the leftmost one (near 0) in the time domain is the receive power of a subcarrier for channel estimation from a sector using zero time-shift, the one near 128 is that from a sector using time-shift of 128, and the one near 256 is that from a sector using time-shift of 256.

As clearly understood from FIG. 11, observation is made in a sequence of the power from sector #21 of base station b2 (FIG. 9), followed by the power from sector #32 of base station b3 (FIG. 9), and then the power from sector #33 of base station b3 (FIG. 9); as for the mobile station, since connecting to sector #33 of base station b3 is suitable in terms of communication path stability, an access request is made to the base station of that sector.

It is thus possible to identify base station sectors simultaneously, and the temporal speed of base station identification is increased. It is also clear that similar effects can be achieved at handover (when changing the connected base station and sector).

A method of precisely estimating channels in this receiver will be explained. While the present embodiment can demodulate same data transmitted simultaneously from two different transmitters, a case will next be described where the transmission timings from two different transmitters are known in advance.

Figure 12:
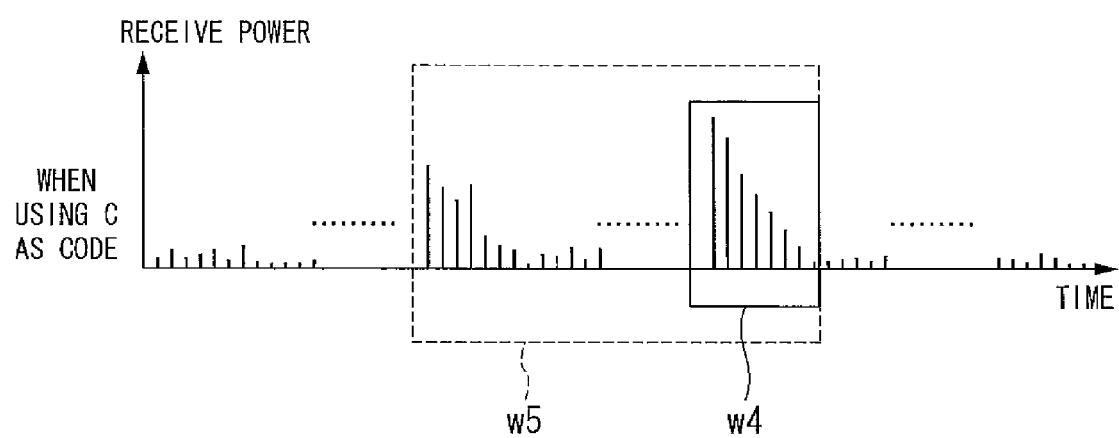
FIG. 12 is a same graph of waveforms in FIG. 11 when a code is set at base station b3 (FIG. 9).

FIG. 12 is a graph showing a waveform the same as that when a code has been set at base station b3 (FIG. 9) as shown in FIG. 11. When a single sector is transmitting at the time of connection, for example, in this example cases from sector #33 of base station b3 increase; accordingly, the window width at the time filter unit 2103 (FIG. 10) is set to the solid-line rectangular region w4, while power in other regions is set to 0. Since this can eliminate the influence of subcarriers for channel estimation from other sectors, precision of channel estimation can be increased.

When same data is being transmitted from sector #23 of base station b3 (a case of CDT diversity), the window width at time filter unit 2103 (FIG. 10) is set to the large dotted-line rectangular region w5, and power in other regions is set to 0. Since this enables a combined channel from two transmitters to be measured while canceling other interferences, the precision of channel estimation can be increased. When using a plurality of channels, a solid-line rectangular region w4 is provided for all base stations, enabling all channels that are subjects for communication to be selected.

By controlling the time window in this manner, and determining the channel after performing FFT to the output of the time window, it becomes possible to configure a receiver that can precisely and simply handle the number of transmitters.

While the foregoing examples assume that the subcarriers for channel estimation have a distinctive pattern, a method will now be simply explained that uses this receiver to measure the power of each sector while implementing CDT diversity even when the subcarriers for channel estimation do not have a distinctive pattern.

While, as in the previous explanations, the number of rotations applied at the transmitter is unique to the base station, the delay time that is applied to the signal according to the number of rotation samples must be approximately the maximum delay wave assumed by the system, or greater than that. Since a system using OFDM normally has a supposed maximum delay wave of GI length, it is preferable that the delay wave be approximately GI length or greater. Expressed as the amount of phase rotation $\phi$ between the carriers, if the ratio between the OFDM symbol time excluding the guard interval and the guard interval time is 1:G, then $\phi \geq 2 \times G \times \pi$.

Although the subcarriers for channel estimation are not orthogonal when such an arbitrary number of rotations is applied, a similar effect can be obtained, except that the receive power from each sector cannot be estimated by using orthogonality.

However, using the configuration of the receiver described above, as shown in FIG. 12 and the like, impulse responses from the respective sectors can be observed at different positions in the time domain. The purpose of the restriction mentioned above, where the rotation amount was made longer than the delay time of supposed maximum delay wave, is to enable separation using this receiver configuration.

By measuring the powers of these separated impulses, the transmission powers of respective sectors can be estimated, and the non-orthogonality of the subcarriers for channel estimation can be corrected.

The above configuration can provide a system capable of accurately estimating the powers between respective sectors while implementing CDT diversity without special means at the receiver.

It should be noted that when allocating codes for creating OFDM symbols for channel estimation to the respective subcarriers, and when allocating communication data to the respective subcarriers, transmission can be made with a phase rotation of $(k-1) \times \phi$ further added to the modulated phase of the kth subcarrier (where k is 1 or an integer larger than 1, and is equal to or smaller than the total number of subcarriers).

Moreover, it is installed in the respective sectors; when allocating codes for creating OFDM symbols for channel estimation to the respective subcarriers, and when allocating communication data to the respective subcarriers, transmission can be made with a phase rotation of $(k-1) \times \phi$ further added to the modulated phase of the kth subcarrier (where k is 1 or an integer larger than 1, and is equal to or smaller than the total number of subcarriers), and $\phi$ can be set so that it is unique for each sector.

(Third Embodiment)

Figure 13A:
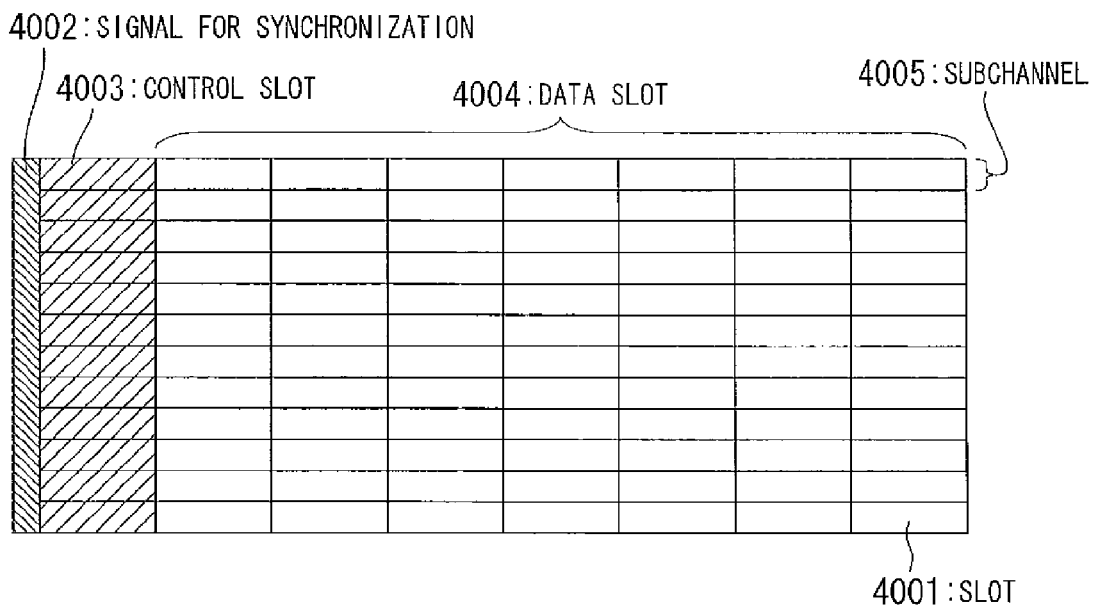
FIG. 13A is an example of the configuration of a frame format of downlink used in the present embodiment.

Subsequently, a third embodiment of the present invention will be explained. The present embodiment describes a case where eight-chip orthogonal codes are used between the sectors, and dedicated subcarriers for channel estimation are used. A dedicated subcarrier for channel estimation means a special subcarrier for channel estimation, and is a subcarrier for channel estimation used by a particular receiver or group of receivers. In the present embodiment, a dedicated subcarrier for channel estimation is used by appending it to a target slot in order to obtain diversity by a soft-combining method in a particular slot. In FIG. 13A explained later, it is inserted in a data slot.

In the present embodiment, a cell is divided into three sectors. The three sectors use synchronized frames.

FIG. 13A is a diagram showing an example of the configuration of a downlink frame format used in the present embodiment. The frame is managed in units of slots 4001 that are divided in the time domain and the frequency domain. A signal for synchronization 4002 is arranged at the head of the frame, followed by a control slot group 4003 and a data slot group 4004. A group of slots in the same frequency band is termed a subchannel 4005. In the present embodiment, one subchannel includes 64 subcarriers, and one frame contains twelve subchannels. One frame therefore includes 768 subchannels.

Figure 13B:
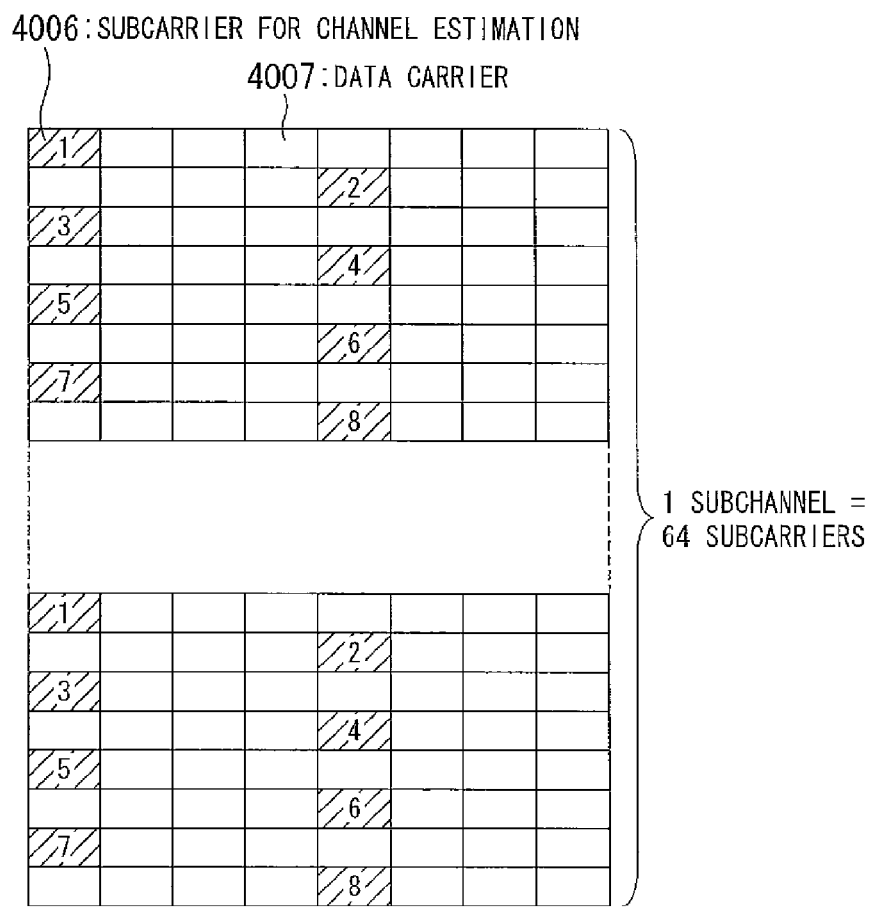
FIG. 13B is an example of the configuration of a frame format of downlink used in the present embodiment.

The control slot contains subcarriers for channel estimation 4006 for estimating a channel. As shown in FIG. 13B, these subcarriers for channel estimation 4006 are temporally divided within the slots. This is to handle, to some degree, fluctuation in the channel. An estimation method that considers channel fluctuation will be explained later in regard to an example of the configuration of a receiver. In the present embodiment, eight OFDM symbols are arranged in the slots. As shown in FIG. 13B, the subcarriers for channel estimation are arranged in the first OFDM symbol and the fifth OFDM symbol. At this time, subcarriers for channel estimation 4006 are provided in odd-numbered subcarriers of the first OFDM symbol, and in even-numbered subcarriers of the fifth OFDM symbol. Moreover, as shown in FIG. 13B, the first subcarrier uses the content of the first chip, the second subcarrier uses the content of the second chip, the eighth subcarrier uses the content of the eighth chip, while the contents of the first chip onwards are arranged again in those from the ninth subcarrier onwards.

While the subcarriers for channel estimation 4006 used in the control slot can basically use any code, since it is easy for the receiver to measure the power of subcarrier for channel estimation of each sector when orthogonal codes are used as the subcarriers for channel estimation of each sector, three codes are selected from eight-chip Walsh codes and used in the respective sectors. FIG. 14A shows eight-chip Walsh codes. A group of codes used is shown as 4104.

Incidentally, while the present embodiment uses an all-1 code for dedicated subcarriers for channel estimation, any type of code can be used that is already known by the transmitter and the receiver.

The control slot contains allocation data for the subsequent data slot. This allocation data indicates which receiver that slot is intended for, modulation parameters of that slot, and whether a dedicated subcarrier for channel estimation is being used or not; by receiving this control slot, the receiver can identify the slot it must receive, and can demodulate that slot.

It should be noted that when using dedicated subcarriers for channel estimation, the subcarriers for channel estimation are inserted into those slots in the same format as shown in FIG. 13B. FIG. 14B is an example of the code used here.

Figure 16:
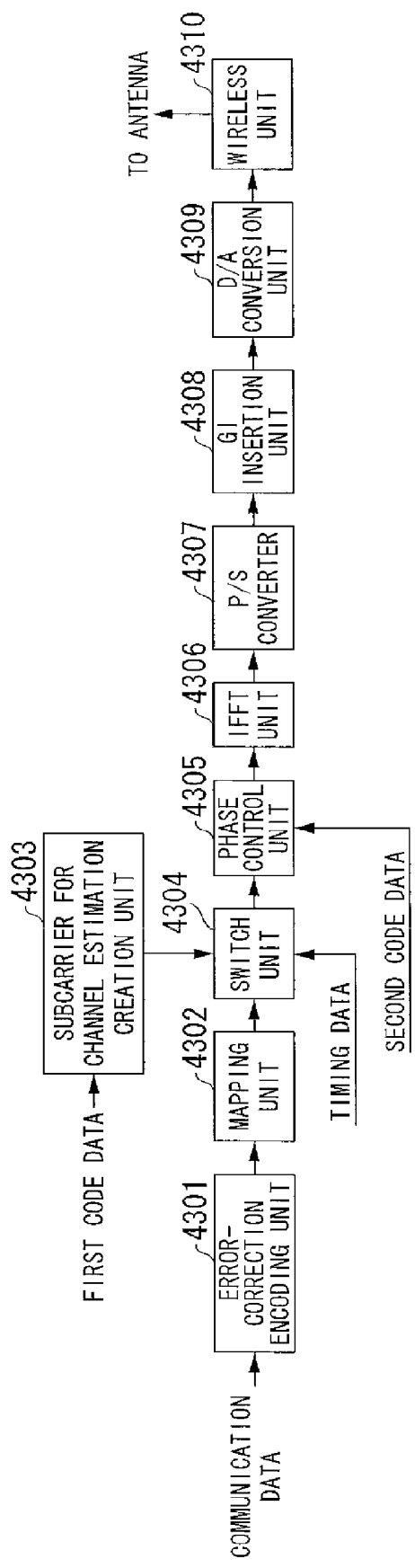
FIG. 16 is a block diagram of the configuration of a sector transmission unit.

When using dedicated subcarriers for channel estimation, an all-1 code is applied as first code data of FIG. 16, and the code rotations shown in FIG. 14B are also applied as second code data.

The group of codes are set such that the code of the first chip is $e^{j0}=1$, and the phase between adjacent chips is an integral multiple of $\pi/4$ (in the present embodiment, 0 to 7 multiplications; any more than these integers being equivalent to a repetition of 0 to 7). These eight codes are mutually orthogonal.

For example, code 4101a shown in FIG. 14B is (1, 1, 1, 1, 1, 1, 1, 1), code 4101b is (1, (1+j)/√2, j, (−1+j)/√2, −1, (−1−j)/√2, −j, (1−j)/√2), code 4101c is (1, j, −1, −j, 1, j, −1, −j), code 4101d is (1, (−1+j)/√2, −j, (1+j)/√2, −1, (1−J)/√2, j, (−1−j)/√2), code 4101e is (1, −1, 1, −1, 1, −1, 1, −1), code 4101f is (1, (−1−j)/√2, j, (1−j)/√2, −1, (1+j)/√2, −j, (1−j)/√2), code 4101g is (1, −j, −1, j, 1, −j, −1, j), and code 4101h is (1, (1−j)/√2, j, (−1−j)/√2, −1, (−1+j)/√2, j, (1+j)/√2).

While in the present embodiment the code of the first chip is $e^{j0}=1$, another value can be used. Also, while the present embodiment uses an eight-chip code, another number of chips can be applied. When applying sixteen chips, similar codes can be created by setting the phase difference between adjacent chips to an integral multiple (0 to 15 multiplications) of $\pi/8$. That is, the phase difference $\phi$ of the code multiplied with consecutive subcarriers for channel estimation is constant, and the code of every M consecutive subcarriers (M being 2 or an integer greater than 2) is orthogonal to a code multiplied with a same subcarrier of another transmitter. While the present embodiment uses all of $\phi=0$, $\pi/4$, $\pi/2$, $3\pi/4$, $\pi$, $5\pi/4$, $3\pi/2$, and $7\pi/4$, it is acceptable to use some of these phase differences.

In other words, when the total number of subcarriers Nsub satisfies a condition $2^{N-1}<\text{Nsub}\leq 2^N$, $\phi$ can be set such that it satisfies $\phi \times 2^N=2n\pi$ (where n is an integer), and M can be set to a submultiple of Nsub.

Subsequently, an example of the configuration of a base station that functions as a transmitter and uses the frame format shown above will be explained in detail.

Figure 15:
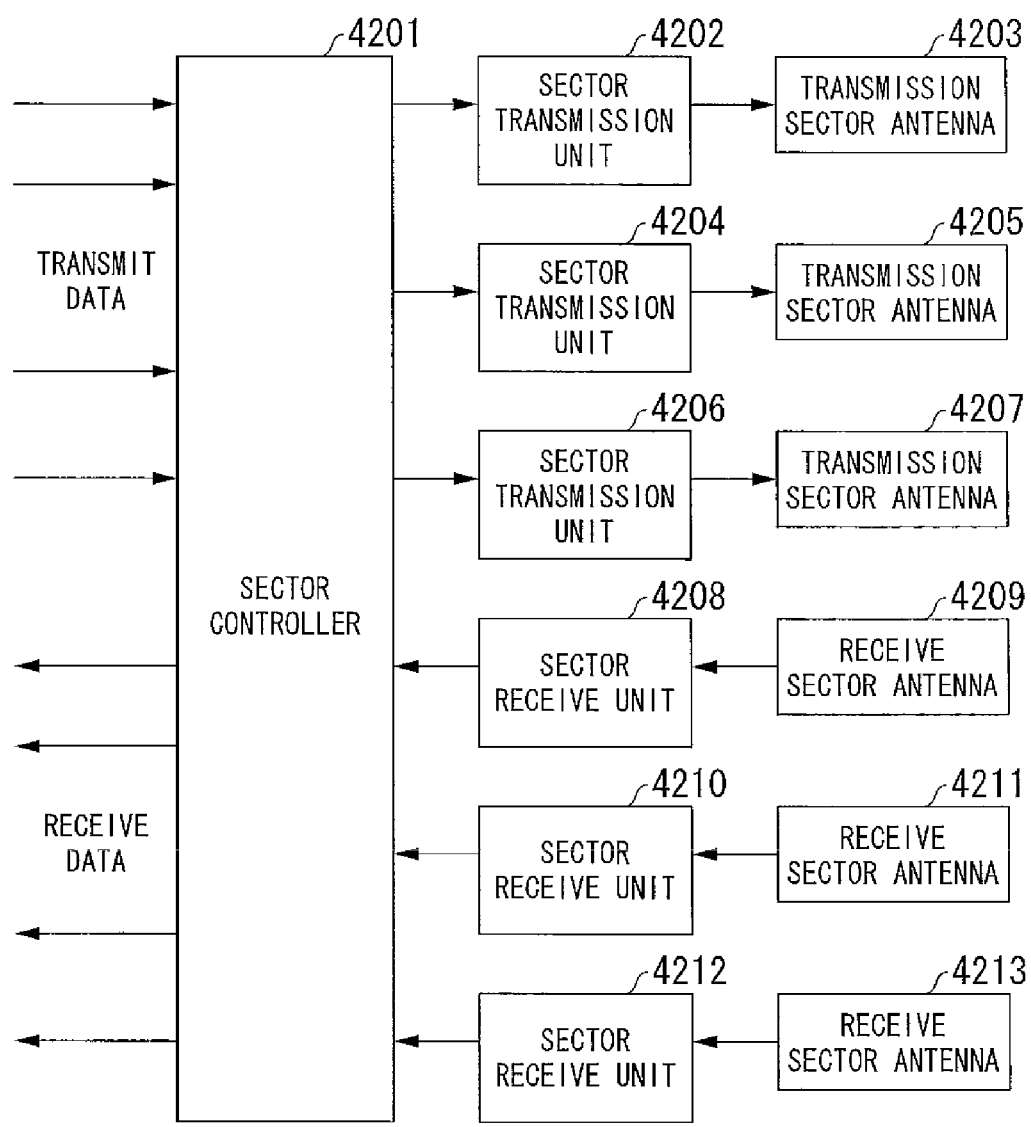
FIG. 15 is a block diagram of the configuration of a transmitter in the present embodiment.

FIG. 15 is a block diagram of the configuration of a transmitter in accordance with the present embodiment. A sector controller 4201 is a block that adjusts the synchronization of the respective sectors, identifies the position of receivers based on signals received from the respective sectors, determines which sector handles which receiver, and allocates data slots in that sector; a sector transmission unit 4202 is a block that creates a transmission signal of sector #1; a transmission sector antenna 4203 is a transmission antenna for sector #1; a sector transmission unit 4204 is a block that creates a transmission signal of sector #2; a transmission sector antenna 4205 is a transmission antenna for sector #2; a sector transmission unit 4206 is a block that creates a transmission signal of sector #3; a transmission antenna 4207 is a transmission antenna for sector #3; a sector receive unit 4208 is a block that demodulates a receive signal of sector #1 and extracts required data; a receive sector antenna 4209 is a receive antenna for sector #1; a sector receive unit 4210 is a block that demodulates a receive signal of sector #2 and extracts required data; a receive sector antenna 4211 is a receive antenna for sector #2; a sector receive unit 4212 is a block that demodulates a receive signal of sector #3 and extracts required data; and a receive sector antenna 4213 is a receive antenna for sector #3.

The configuration from the sector receive unit 4208 to the sector receive unit 4212 will not be explained in detail, since it is not relevant to the fundamentals of the present embodiment. Provided that data can be transmitted from the receivers, and it is possible to identify which sector a receiver is arranged in based on a signal from that receiver, any type of scheme can be used. Specifically, it is possible to use any method such as those used in cellular systems such as personal digital cellular (PDC), global system for mobile communications (GSM), and code division multiple access (CDMA).

The configurations from sector transmission unit 4202 to sector transmission unit 4206 are all identical.

As described above, in the transmitter in accordance with the present embodiment, the phase difference $\phi$ of the code multiplied with consecutive subcarriers for channel estimation is constant, and a code obtained by complex multiplication of the code of every M consecutive subcarriers (M being 2 or an integer greater than 2) and a code that is orthogonal to a code multiplied with same subcarriers of another transmitter, is transmitted to a receiver as a subcarrier for channel estimation, and, when transmitting same data to a same receiver simultaneously in conjunction with another transmitter using the same frequency band, a phase rotation of $(m-1)\times\phi$ is further added to the phase of the mth subcarrier (where m is 1 or an integer larger than 1, and is equal to or smaller than the total number of subcarriers in a communication band) that has been modulated with data.

FIG. 16 is a block diagram of the configuration of a sector transmission unit. An error-correction encoding unit 4301 is a block that performs error-correction encoding to data transmitted from sector controller 4201; a mapping unit 4302 is a block that allocates signals that have been error-correction encoded to the respective subcarriers of an OFDM symbol; a subcarrier for channel estimation creation unit 4303 is a block that creates a subcarrier for channel estimation which is inserted in accordance with first code data specified by sector controller 4201; a switch unit 4304 is a block that switches data of a specified subcarrier at a timing specified by the sector controller 4201 between a mapped signal and a subcarrier for channel estimation; and a phase control unit 4305 is a block that controls the phase of a subcarrier of a subchannel in accordance with the code and a timing specified by sector controller 4201.

In addition, an IFFT unit 4306 is a block that converts data of the respective subcarriers, i.e., data in the frequency domain, to signals in the time domain by performing an inverse fast Fourier transform (IFFT); a parallel/serial (P/S) converter 4307 is a block that serializes the output of the IFFT unit 4306; a guard interval (GI) insertion unit 4308 is a block that inserts part of an OFDM symbol as a guard interval; a digital/analog (D/A) converter 4309 is a block that converts a digital signal to an analog signal; and a wireless unit 4310 is a block that converts a baseband signal output from the D/A converter 4309 to a frequency band that will be actually output from an antenna, and increases the amplitude to the required power.

Hereinafter, a procedure of transmitting a signal having the frame format shown in FIG. 13A will be explained.

Firstly, sector controller 4201 accumulates data that will be transmitted to the respective receivers over a certain length of time. Simultaneously, it uses data obtained from sector receive unit 4208, sector receive unit 4210, and sector receive unit 4212 (hereinafter "sector receive unit group") to determine which sector contains which receiver. It then determines which sector to transmit the accumulated transmission data to. After determining the transmission data for respective sectors, it determines the allocation of data slots 4004 for transmitting the data. After allocating data slots 4004, it creates content for the control slot 4003 in accordance with the allocated state.

After determining the contents to be transmitted, it sets a code for generating a signal for synchronization 4002 in the subcarrier for channel estimation creation unit 4303 of a group of the sector transmission units. While this signal for synchronization can basically be of any type, since a signal whose autocorrelation has the single peak in the time domain makes it easy to maintain synchronization performance on the receiver side, a code of that type is normally selected. Simultaneously, the switch unit 4304 is switched to the subcarrier for channel estimation creation unit 4303 side, the phase rotation amount of the phase control unit 4305 for each subcarrier is set to 0, and the signal for synchronization 4002 is then output from the wireless unit. The subcarrier for channel estimation creation unit 4303 is then set to create a subcarrier for channel estimation to be used in that sector, in this case, one of the Walsh codes allocated to the sector in advance as shown above.

Simultaneously, the content of the control slot 4003 is input to the error-correction encoding unit 4301. The switch unit 4304 is then switched, and transmission is controlled such that subcarriers for channel estimation are contained in odd-numbered subcarriers of the first OFDM symbol of the control slot 4003 and in even-numbered subcarriers of the fifth OFDM symbol, while other subcarriers contain the content of the control slot 4003. The phase rotation amount of the respective subcarriers of the phase control unit 4305 is kept at 0.

After the control slot 4003, the data slot 4004 is transmitted. The content of the data slot 4004 is input to the correction encoding unit 4301. The switch unit 4304 is switched to the mapping unit 4302 side, such that the contents of all data slots are transmitted in a later stage.

While transmitting the content of the data slot, the sector controller creates data for transmission in the next frame, and performs similar processes from the transmission process of the signal for synchronization 4002 at the next frame start timing. By repeating this procedure, a signal having the frame format shown in FIG. 13A can be transmitted.

Subsequently, an operation of the base station when performing the soft-combining method will be explained.

When the sector controller 4201 (FIG. 15) determines that a receiver is at a sector interface, which is information from a group of the sector receive units, it uses the soft-combining method. Here, the receive powers of respective sectors at the receiver explained later can conceivably be used as data for determining whether to use the soft-combining method. At this time, the sector controller 4201 allocates slots of subchannels for soft-combining method for the same time in adjacent sectors. Here, dedicated subcarriers for channel estimation are appended to slots for soft-combining. By arranging slots using dedicated subcarriers for channel estimation at the rear side of the frame, normal slots that do not use dedicated subcarriers for channel estimation are arranged at the front side of the frame near the subcarriers for channel estimation at the head of the frame, thereby increasing the demodulation performance of the overall frame during reception.

Having determined the allocation of the data slot 4004, in accordance with the procedure described above, the sector controller 4201 (FIG. 15) transmits the signal for synchronization 4002 (FIG. 13A), transmits the control slot 4003, and transmits the data slot 4004. When transmitting slots that perform soft-combining, the sector controller 4201 sets a code for the dedicated subcarrier for channel estimation in the subcarrier for channel estimation creation unit 4303. While this code can theoretically be any type of code, an all-1 code is used to facilitate understanding in the present embodiment. The dedicated subcarrier for channel estimation is appended by switching the switch unit 4304 in the same manner as the control slot. The sector controller simultaneously controls the phase control unit 4305 such as to control the phase of the subchannels contained in that slot using the code set in that sector. Codes used here are shown in FIG. 14B, and three codes are selected from among theses codes, which are allocated to respective sectors and are used. In the present embodiment, codes 4101a, 4101b, and 4101c from among these codes are respective used in sectors #1 to #3.

Figure 17:
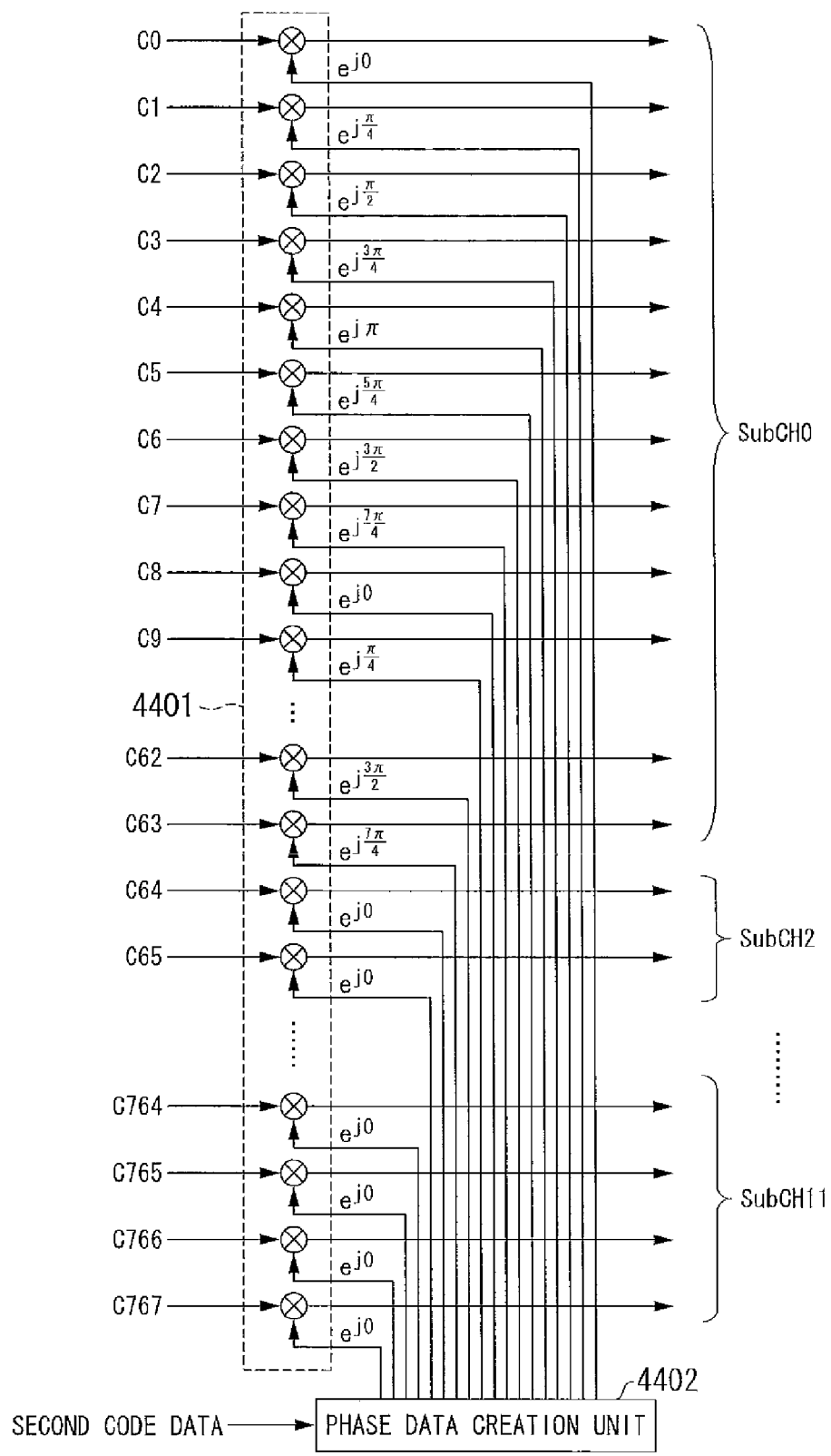
FIG. 17 is a diagram of the configuration of a phase control unit 4305.

FIG. 17 is a diagram showing the configuration of the phase control unit 4305 (FIG. 16). The phase control unit 4305 consists of a complex multiplication unit 4401 that multiplies respective subcarriers by arbitrary complex numbers, and a phase data creation unit 4402 that creates values multiplied with respective subcarriers from code data received from the sector controller 4201. FIG. 17 illustrates a case where code 4101b (FIG. 14B) is applied to a first subchannel. Since the length of one code is 8 and the number of subcarriers in one subchannel is 64, the phase data creation unit 4402 creates a code obtained by repeating a code specified by the sector controller 4201 eight times, and multiplies the code by the respective subcarriers of the specified subchannel. Subcarriers for which no phase control is specified are multiplied by 1 such that their phase does not change. By controlling in this manner, in the output signal, only the phases of specified subchannels have been adjusted.

In the example of FIG. 17, the phase difference between adjacent subcarriers is set to $\pi/4$, IFFT at the later-stage is processed by 1024 points, and a signal where only the first subchannel circulates by 128 samples is created from the relationship of equation (3) below, which is a Fourier transform formula.

[Formula 2]

$$s(f)e^{-j2\pi f} \Leftrightarrow s(t-\tau) \quad (3)$$

In a slot where soft-combining is performed, by using different phase control codes in the respective sectors, signals with different numbers of circulations and the same content are transmitted to the respective sectors for only that slot, whereby path diversity can be achieved using CDT diversity.

Figure 18:
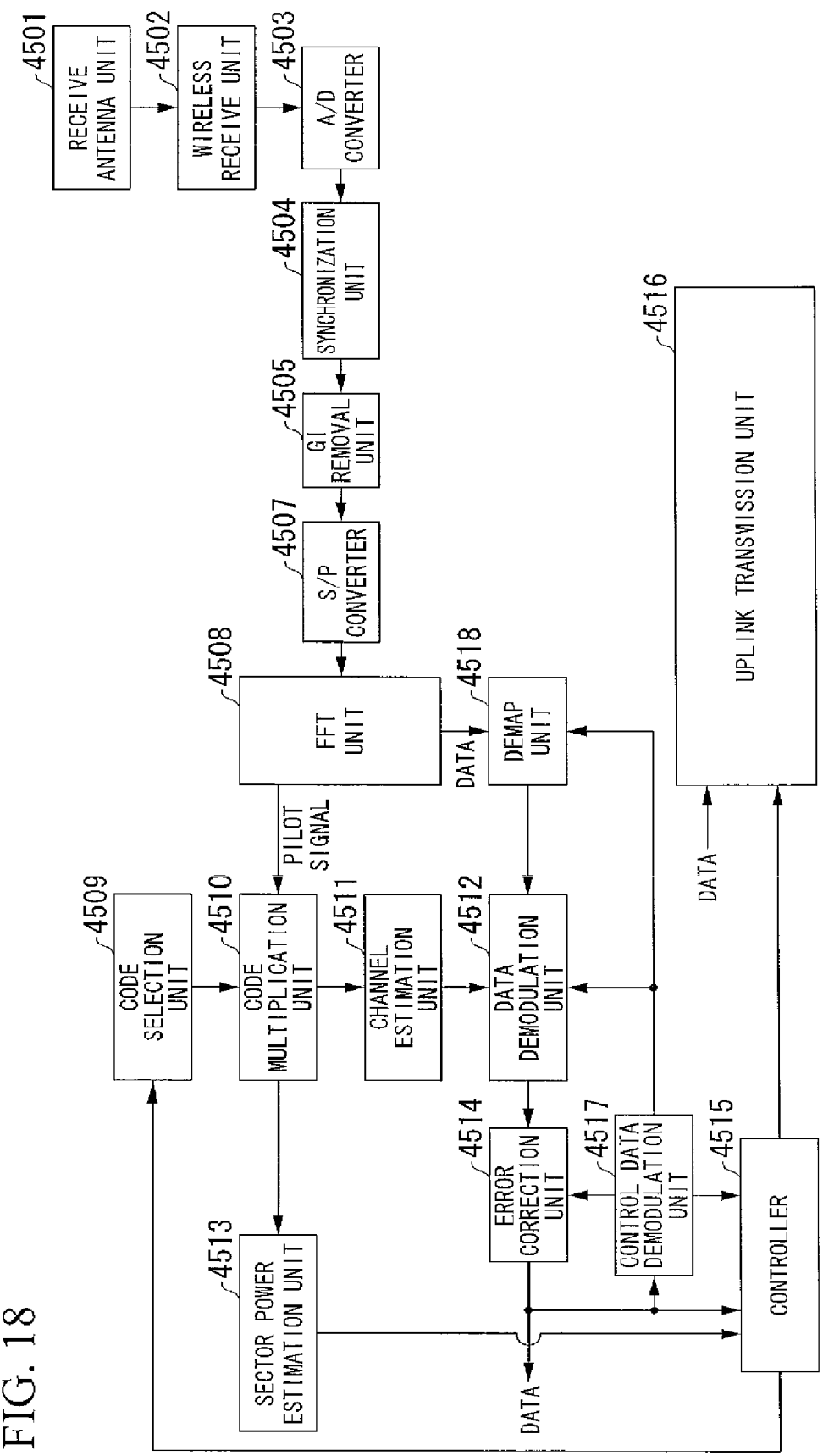
FIG. 18 is a block diagram of the configuration of a receiver in the present embodiment.

FIG. 18 is a block diagram showing the configuration of a receiver in accordance with the present embodiment. A receive antenna unit 4501 is a block that receives a radio wave and converts it to an electrical signal; a wireless receive unit 4502 is a block that selects a required signal from a received signal and converts it to a baseband signal; an A/D converter 4503 is a block that converts an analog baseband signal to a digital signal; a synchronization unit 4504 is a block that uses a signal for synchronization 4002 to synchronize the frequency and the time of the entire frame; a GI removal unit 4505 is a block that removes GI from a received signal; and an SIP converter 4506 is a block that parallelizes a signal such that a fast Fourier transform (FFT) can be performed.

In addition, an FFT unit 4508 is a block that performs an FFT to an input signal; a code selection unit 4509 is a block that selects a code multiplied with data of respective subcarriers in compliance with a command from a controller 4515; a code multiplication unit 4510 is a block that multiplies the data of the respective subcarriers by a code output from the code selection unit 4509; a channel estimation unit 4511 is a block that estimates a channel based on data of the respective subcarriers multiplied by the code; a demap unit 4518 is a block that extracts data mapped to the respective subcarriers as a data stream; a data demodulation unit 4512 is a block that uses channel data estimated by the channel estimation unit 4511 to demodulate receive data, a sector power estimation unit 4513 is a block that estimates the receive powers of a plurality of sectors that are currently receiving based on the data of the respective subcarriers multiplied by the code; an error correction unit 4514 is a block that performs error-correction decoding of demodulated receive data; a controller 4515 is a block that controls each block in compliance with the content of receive data, and uses an uplink transmission unit 4516 to transmit required data to a base station; an uplink transmission unit 4516 is a block that transmits data from the controller 4515 and other data to be transmitted to a base station, to the base station; and a control data demodulation unit 4517 is a block that demodulates the control slot 4003, and determines how a subsequent data slot is to be received.

Of these units, the uplink transmission unit 4516 will not be explained in detail since it is not an essential feature of the present embodiment, and any method can be used so long as the base station can receive.

Hereinafter, an operation of a receiver of this configuration will be explained. The receive antenna 4501 of the receiver receives waves, the wireless receive unit 4502 extracts a required signal and converts it to the baseband, and the A/D converter 4503 converts it to a digital signal. The synchronization unit 4504 uses the signal for synchronization 4002 (FIG. 13A) arranged at the head of the frame in that signal to perform time-synchronization of the entire frame. Any method of time-synchronization can be used.

By way of example, there is a method of measuring a cross-correlation of the time waveform of the signal for synchronization 4002 and the waveform of the receive signal, and determining the point where the correlation value is highest as the frame start time. Let us suppose that, in subsequent blocks, time-synchronization and processing in OFDM symbol units are performed. The GI removal unit 4505 removes the GI, and the S/P converter 4506 performs parallelizing to convert the signal to a format that can be handled by the FFT unit 4507.

The controller 4515 of the receiver uses the code selection unit 4509, the code multiplication unit 4510, and the sector power estimation unit 4513 to measure the receive powers of the signals transmitted from antennas of respective sectors. There are various methods of measuring the receive powers of the respective sectors, and any methods can be used. For example, it is possible to utilize a method of performing an FFT to the signal of control slot 4003 (FIG. 13A) containing a subcarrier for channel estimation, multiplying the signal which the subcarrier containing the subcarrier for channel estimation has been extracted by complex conjugates of the codes of the subcarriers for channel estimation being used in the respective sectors, and then obtaining the receive powers of respective sectors by calculating the square mean of the amplitudes of respective subcarriers. Using the uplink transmission unit 4516, the controller 4515 reports the number of the sector with the largest sector power as the currently contained sector to the transmitter that is the base station. It simultaneously reports the receive powers of respective sectors for controlling soft-combining method. Thereafter, the receiver regularly measures the sector power, and regularly reports data relating to the sector to the base station. After reporting the number of the sector contained in the base station, it shifts to a receive operation for that sector.

Firstly, the receiver receives the control slot, and estimates a channel using the subcarrier for channel estimation contained therein. In the present embodiment, since subcarriers for channel estimation are inserted at a plurality of times in the slot, various methods can be used in determining the channel.

FIG. 19 is an explanatory diagram of one example of a method of estimating a channel in accordance with the present embodiment.

Figure 19A:
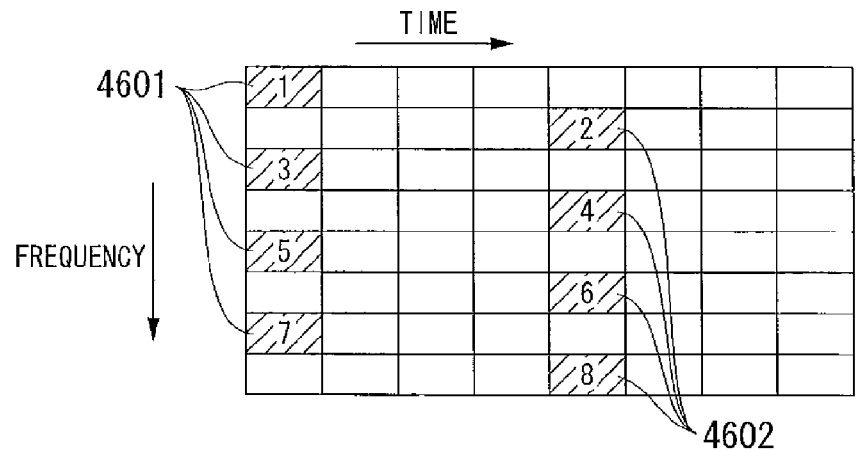
FIG. 19A is an explanatory diagram of a channel estimation method in accordance with the present embodiment.
Figure 19B:
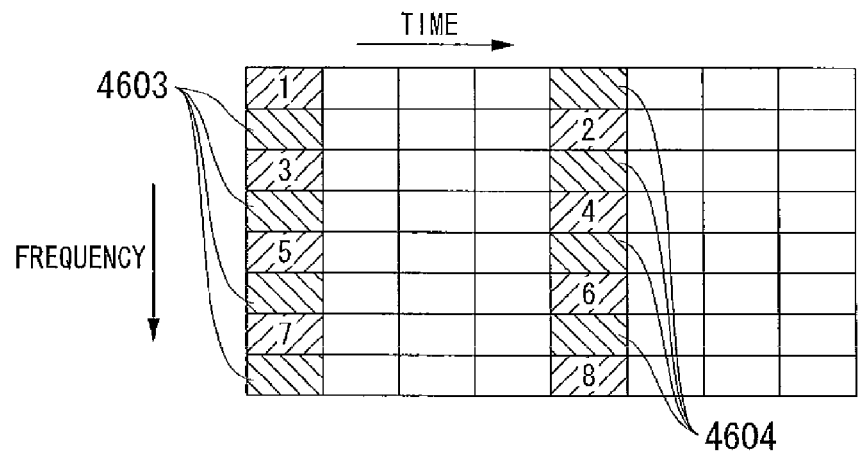
FIG. 19B is an explanatory diagram of a channel estimation method in accordance with the present embodiment.

FIG. 19A is a diagram of eight subcarriers extracted from one slot. First, the controller 4515 (FIG. 18) makes the code selection unit 4509 output a complex conjugate of the code used in the subcarrier for channel estimation of the control slot by the sector it is attempting to received therefrom. Then, using the code multiplication unit 4510, it multiplies the signal of the subcarriers of the first OFDM symbol where the code for channel estimation of the received signal is arranged by the codes used in the first half of the slot during transmission in that sector, here, a group of the first, third, fifth, and seventh codes, i.e., a complex conjugate of a subcarrier for channel estimation 4601, and determines the channel of the subcarrier corresponding to the first OFDM symbol. It then multiplies the signal of the subcarriers of the fifth OFDM symbol where the code for channel estimation is arranged by the codes used in the second half of the slot during transmission in that sector, here, a group of the second, fourth, sixth, and eighth codes, i.e., a complex conjugate of 4602 in the figure, and determines the channel of the relevant subcarrier of the fifth OFDM symbol.

Subsequently, it determines the channels of the subcarriers of the first OFDM symbol where no codes for channel estimation are arranged. These subcarriers are indicated by 4603 in FIG. 19B. The channels of these subcarriers are determined by linear interpolation of the channels of the subcarriers of the first OFDM symbol determined earlier. Similarly, it determines the channels of the subcarriers of the fifth OFDM symbol where no codes for channel estimation are arranged. These subcarriers are indicated by 4604 in FIG. 19B. Similarly, the channels of these subcarriers are determined by linear interpolation of the channels of the subcarriers of the fifth OFDM symbol determined earlier.

Figure 19C:
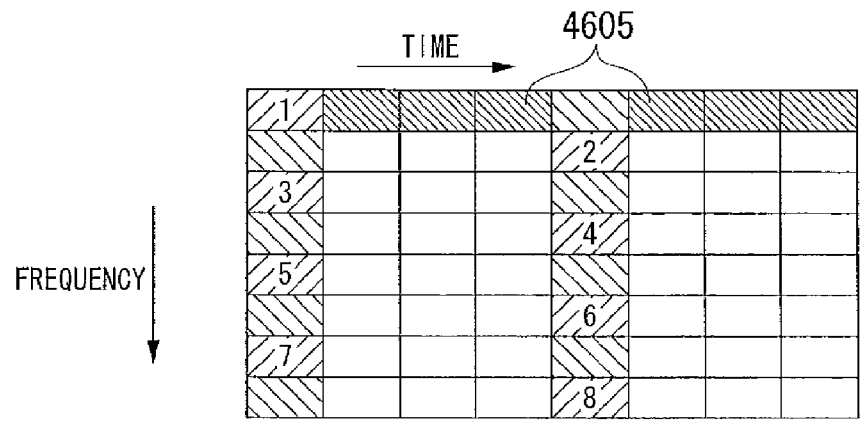
FIG. 19C is an explanatory diagram of a channel estimation method in accordance with the present embodiment.

Channels of the respective subcarriers of the remaining symbols are determined using the channels of the first and fifth OFDM symbols which have been determined. In the present embodiment, the channels of the remaining OFDM symbols are determined by interpolating the channels of the first OFDM symbol and the channels of the fifth OFDM symbol of a given subcarrier. In FIG. 19C, 4605 represents subcarriers determined by linear interpolation of the first subcarrier. By performing interpolation for all subcarriers, even when the channels fluctuate within the slots, the channels can be estimated while keeping track of these fluctuations.

While an estimation here is performed for some (eight) of the subcarriers, the same method can be used to estimate channels for all 64 subcarriers of one slot, or for 768 subcarriers of all slots.

Moreover, when a slot attempting to be demodulated does not contain a subcarrier for channel estimation, the subcarrier for channel estimation of slots that are temporally in front or behind it, and of different slots in the frequency domain, are used; in this case, an estimation made by extending the time corresponding to the fluctuation in a slot containing subcarriers for channel estimation may increase error. In such cases, error can be reduced by using an average of the channels in the slot containing subcarriers for channel estimation as an estimation value for other slots.

At the same time as estimating the channel, the demap unit 4518 is used to extract the data in the control slot, the channel data output from the channel estimation unit 4511 is used in demodulation by the data demodulation unit 4512, and, after error-correction by the error correction unit 4514, the data is input to the control data demodulation unit 4517. The control data demodulation unit 4517 analyzes allocation data of a subsequent data slot 4005, and determines which slot should be received and which modulation scheme should be used.

At the timing of transmitting the slot to be received, the control data demodulation unit 4517 operates the demap unit 4518, the data demodulation unit 4512, and the error correction unit 4514, and extracts the receive data.

When it is determined, as a result of demodulating the control data, that the slot being received is using a dedicated subcarrier for channel estimation, the control data demodulation unit 4517 makes a request to the controller 4515 to re-estimate the channel of that slot using a dedicated subcarrier for channel estimation. The estimation method is basically the same as that used for the control slot 4003. However, the controller 4515 determines the timing of demodulating the dedicated subcarrier for channel estimation from the output of the control data demodulation unit 4517, controls the code selection unit 4509 at that demodulation timing, and sets a complex conjugate (all-1 in the present embodiment) of the code used by the dedicated subcarrier for channel estimation.

The channel can be estimated using the same method as that of the subcarriers for channel estimation of the control slot. Subsequently, the relevant slot is demodulated by operating the demap unit 4518, the data demodulation unit 4512, and the error correction unit 4514, thereby the slot using a dedicated pilot can be demodulated normally.

The slot using a dedicated subcarrier for channel estimation can be received by the same method irrespective of whether path diversity by CDT diversity is performed or not. Even if CDT diversity is performed, the codes multiplied by the phase control unit 4305 of each sector at the time of transmission merely circulate output signals in the time domain, and signals that are transmitted from a plurality of sectors and then combined appear to be received as if subcarriers for channel estimation (all-1 in the present embodiment) that have been set as the dedicated subcarriers for channel estimation and data portions are being received in a multipath state.

The above operation makes it possible to implement a transmitter and a receiver that apply CDT diversity only to a specific slot at a sector edge.

It should be noted that while in the present embodiment, subcarriers for channel estimation are not appended to data slots that do not use the soft-combining method, the subcarriers for channel estimation used in the control slot can be appended. Although this reduces the number of bits that can be transmitted in the data slot, the channel estimation performance of the data slot is enhanced. This can be selected in accordance with the envisaged communication environment.

(Fourth Embodiment)

In the present embodiment, a switch between application (when transmitting same data from a plurality of sectors) and non-application of CDT diversity (when transmitting different data in all the sectors) to signals transmitted from a plurality of transmission antennas (particularly in a plurality of sectors) is made over time; in addition, CDT diversity is not applied in a subcarrier for channel estimation portion (a time delay is not appended), while CDT diversity is applied only in a data portion.

The frame configuration that is a subject in the present embodiment is similar to that described in the first embodiment of FIG. 1. Here, the frame that is a subject has a total of ten symbols, including a subcarrier for channel estimation of one symbol appended at the head, and data signals of nine subsequent symbols. All frequency subchannels in one frame transmitted from one sector are occupied by one user.

It should be noted that no time delay is appended to the subcarriers for channel estimation between transmission antennas, and time delay is appended only to the data portions, whereby the CDT diversity effect can be obtained.

Figure 20:
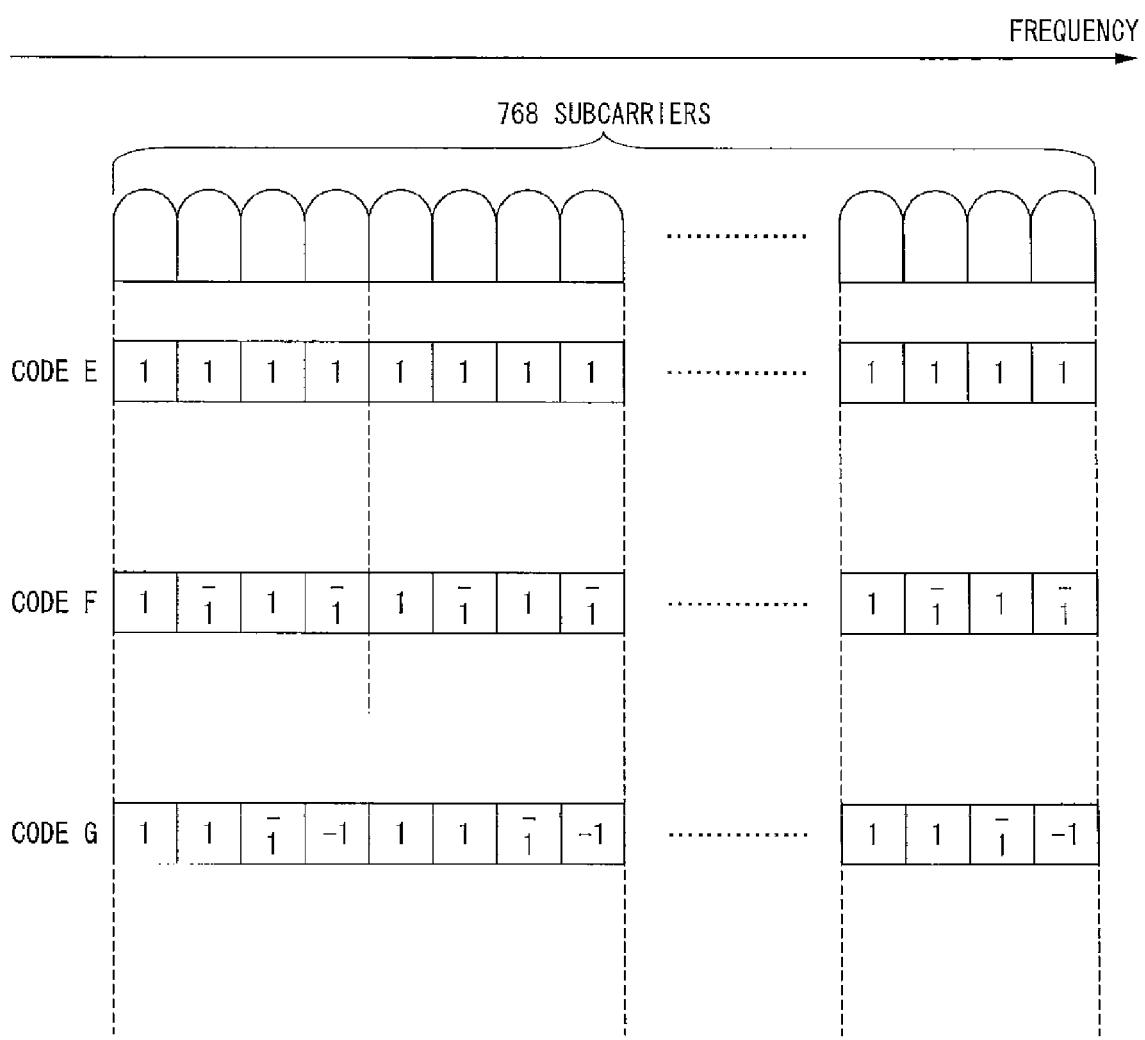
FIG. 20 is an example of codes used for subcarriers for channel estimation in the present embodiment.

FIG. 20 shows an example of codes used in subcarriers for channel estimation of the present embodiment. As shown in FIG. 20, the present embodiment uses codes created by repeating four-chip orthogonal codes by the number of subcarriers (a code having a code length of 768 obtained after 192 repetitions of a four-chip code). By using codes that are orthogonal every four chips, when frequency fluctuation is not severe, orthogonality can be maintained among a plurality of signals traveling along different channels, and channel fluctuation can be estimated without mutual interference. Since the orthogonal codes E, F, and G mentioned earlier are used in subcarriers for channel estimation of the respective sectors, these codes are hereinafter termed "orthogonal codes unique to the sectors".

Moreover, while FIG. 20 shows an example that uses an orthogonal variable spreading factor (OVSF) code, this is not limitative of the present invention.

Figure 21:
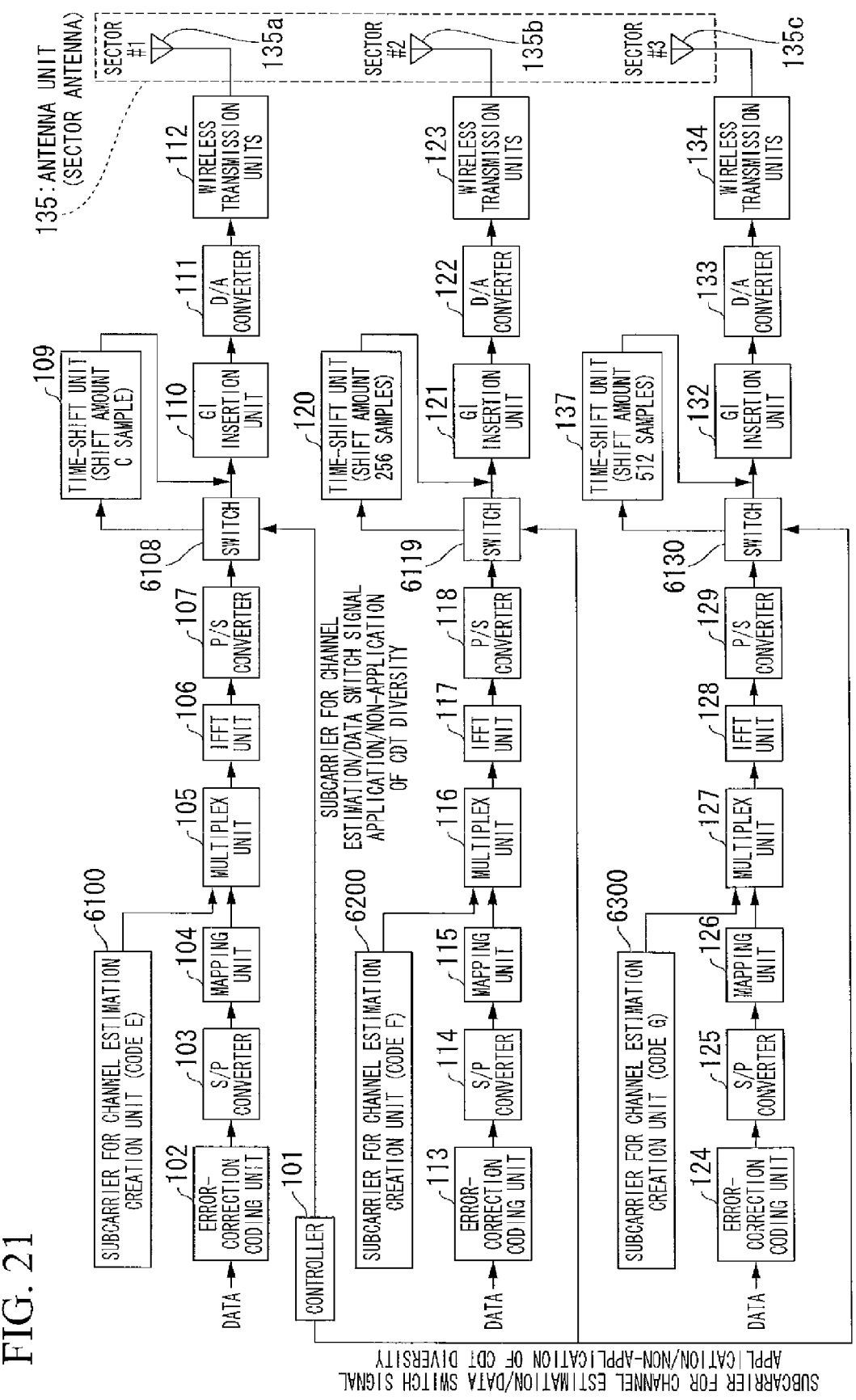
FIG. 21 is a block diagram of the configuration of a transmitter in the present embodiment.

FIG. 21 is a block diagram of the configuration of a transmitter in accordance with the present embodiment. In this transmitter, no time delay is appended to the subcarriers for channel estimation between transmission antennas, and time delay is appended only to the data portions, whereby the CDT diversity effect can be obtained. Although FIG. 21 is similar to the first embodiment shown in FIG. 3, it differs in that subcarrier for channel estimation creation units 6100, 6200, and 6300 create subcarriers for channel estimation using codes unique to the sectors shown in FIG. 20 and transmit them to multiplex units 105, 116, and 127, and that, when switches 6108, 6119, and 6130 are notified by a subcarrier for channel estimation/data switch signal that the outputs of the P/S converters 107, 118, and 129 are signals forming data portions, as in FIG. 3, in compliance with the switch between application/non-application of CDT diversity, when applying CDT diversity, the outputs of the P/S converters 107, 118, and 129 are input to time-shift units 109, 120, and 137, and when not applying CDT diversity, the outputs of the P/S converters 107, 118, and 129 are input to GI insertion units 110, 121, and 138; on the other hand, when the switches 6108, 6119, and 6130 are notified that the outputs of the P/S converters 107, 118, and 129 are signals forming subcarrier for channel estimation portions, the outputs of the P/S converters 107, 118, and 129 are input to the GI insertion units 110, 121, and 138, and that a controller 6101, in addition to a notification signal relating to application/non-application of CDT diversity, notification of the subcarrier for channel estimation/data switch signal is made to the switches 6108, 6119, and 6130.

Since in FIG. 21 the error-correction coding units 102, 113, and 124, the S/P converters 103, 114, and 125, the mapping units 104, 115, and 126, the multiplex units 105, 116, and 127, the IFFT units 106, 117, and 128, the P/S converters 107, 118, and 129, the time-shift units 109, 120, and 131, the GI insertion units 110, 121, and 132, the D/A converters 111, 122, and 133, the wireless transmission units 112, 123, and 134, and the antenna unit 135 are the same are those in the first embodiment (FIG. 3), they are denoted by like reference numerals and explanation thereof is omitted.

Figure 22:
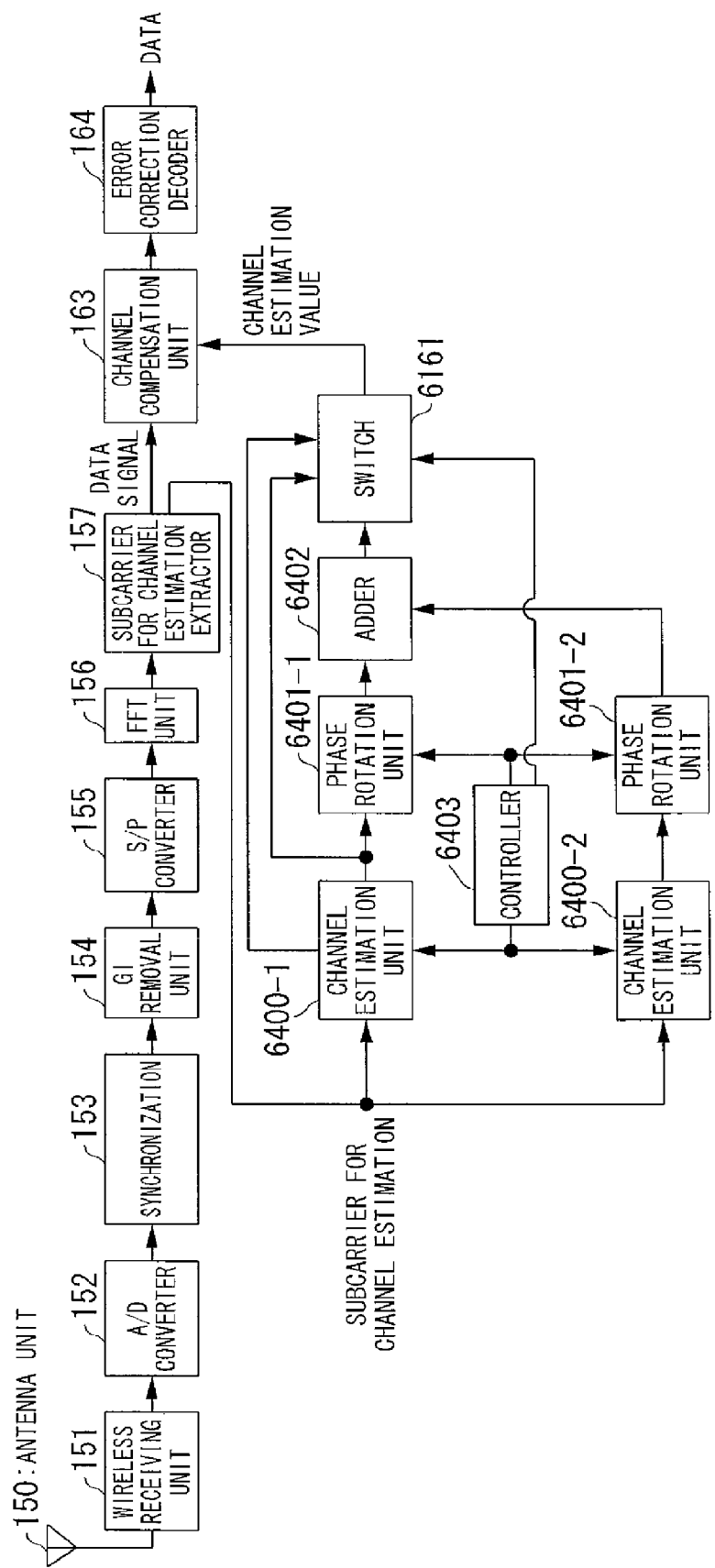
FIG. 22 is a block diagram of the configuration of a receiver in the present embodiment.

FIG. 22 is a block diagram of the configuration of a receiver in the present embodiment.

In FIG. 22, since the antenna unit 150, the wireless receiving unit 151, the A/D converter 152, the synchronization unit 153, the CI removal unit 154, the S/P converter 155, the FFT unit 156, the subcarrier for channel estimation extractor 157, the channel compensation unit 163, and the error correction decoder 164 are the same as those in the first embodiment (FIG. 5), they are denoted by like reference numerals and explanation thereof is omitted.

A subcarrier for channel estimation output from the subcarrier for channel estimation extractor 157 is subjected to channel estimation by channel estimation units 6400-1 and 6400-2 using subcarriers for channel estimation from respective sectors, and obtained channel estimation values are output to respective phase rotation units 6401-1 and 6401-2. The phase rotation units 6401-1 and 6401-2 append a phase rotation of k·θ to the kth subcarrier in accordance with a phase rotation amount θ notified from the controller 6403, and output to an adder 6402. The adder 6402 adds the outputs from the phase rotation units 6401-1 and 6401-2, and outputs to a switch 6161.

As described above, depending on the number of transmitters, the receiver of the present embodiment uses different methods to estimate channel data. Also, when receiving same data from a plurality of transmitters, the receiver of the present embodiment calculates channel data from the respective transmitters, and, from the respective channel data, calculates combined channel data when receiving data.

Figure 23:
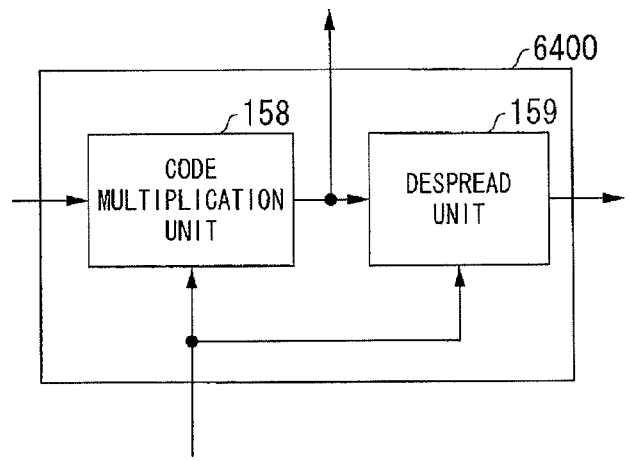
FIG. 23 is a block diagram of the configurations of channel estimation units 6400-1 and 6400-2 in accordance with the present embodiment.
Figure 24:
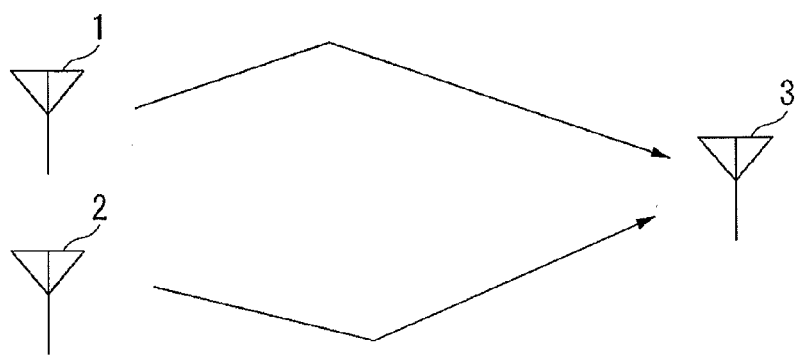
FIG. 24 is a conceptual diagram of a state where signals from transmission antennas 1 and 2 belonging to two different sectors are transmitted to a receive antenna 3 belonging to a receiver.
Figure 27A:
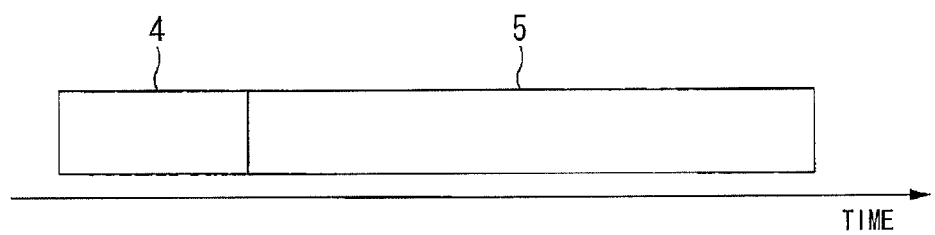
FIG. 27A is a configuration of a signal transmitted from transmission antenna 1.
Figure 27B:
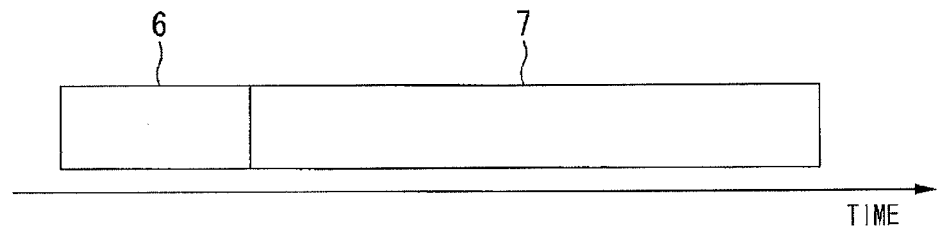
FIG. 27B is a configuration of a signal transmitted from transmission antenna 2.
Figure 28:
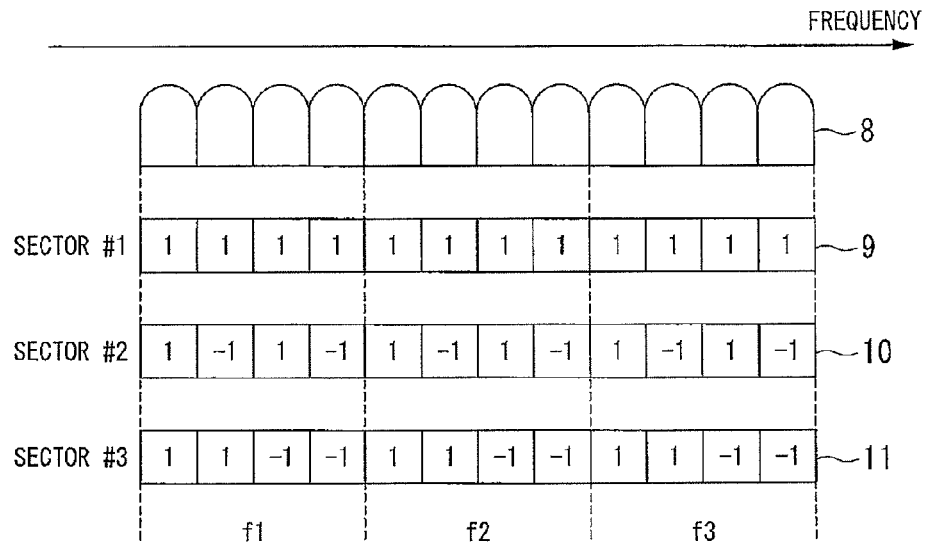
FIG. 28 is a diagram of signals transmitted from a plurality of sectors.
Figure 29:
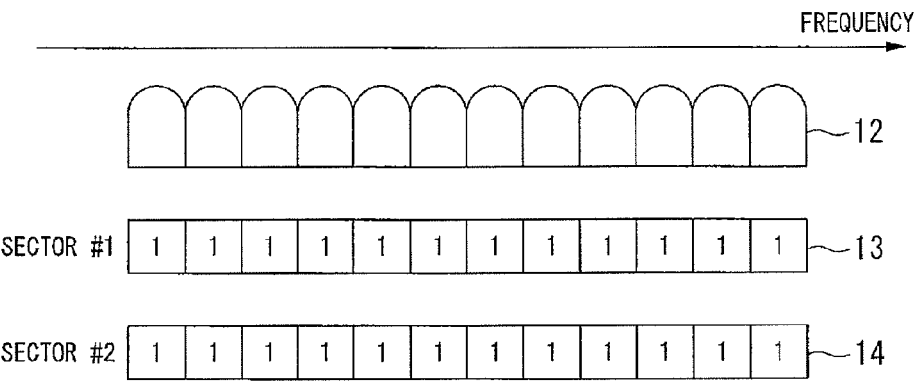
FIG. 29 is a diagram of a transmission signal when delay profiles h1=h2=1, i.e., when there is no delayed wave, and there is no phase rotation and no change in the amplitude of the direct wave.

FIG. 23 is a block diagram of the configuration of channel estimation units 6400-1 and 6400-2 (referred to collectively as 6400) in accordance with the present embodiment. The channel estimation units 6400-1 and 6400-2 each consists of a code multiplication unit 158 and a despread unit 159. The code multiplication unit 158 multiplies the output of the subcarrier for channel estimation extractor 157 by complex conjugates of the orthogonal codes unique to the sectors shown in FIG. 20, and outputs this to the despread unit 159. The channel estimation unit 6400-1 also outputs to the switch 6161. The despread unit 159 integrates the output of the code multiplication unit 158 every four chips, and calculates an average thereof to obtain a channel estimation value for every four chips (four subcarriers), which is then output to the phase rotation units 6401-1 and 6401-2 as the outputs of the channel estimation units 6400-1 and 6400-2.

Moreover, the orthogonal codes unique to the sectors notified from the controller 6403 are input to the code multiplication unit 158 and the despread unit 159.

The switch 6161 obtains three types of inputs from the code multiplication unit 158 contained in the channel estimation unit 6400-1, the channel estimation unit 6400-1, and the adder 6402; in addition, when it is notified by a selection signal output from the controller that the status of the signal received by the receiver is good and sufficient signal quality is achieved, the switch 6161 transmits the output of the code multiplication unit 158 as a channel estimation value to the channel compensation unit 163, whereas, when the status of the signal received by the receiver is poor and insufficient signal quality is achieved, the switch 6161 transmits the output of the channel estimation unit 6400-1 as a channel estimation value to the channel compensation unit 163; when CDT diversity is being performed, the switch 6161 outputs the output of the adder 6402 as a channel estimation value to the channel compensation unit 163.

Moreover, when CDT diversity is not being performed, the controller 6403 notifies the channel estimation unit 6400-1 of an orthogonal signal unique to a desired sector, and when CDT diversity is being performed, it notifies the channel estimation units 6400-1 and 6400-2 of an orthogonal code unique to a desired sector.

Furthermore, if T represents the delay time appended to the data portion at one sector during application of CDT diversity at a transmitter (base station) shown in FIG. 21, the controller 6403 notifies the phase rotation units 6401-1 and 6401-2 of a phase rotation amount θ determined as θ=2π·fc·T, and foregoing phase rotation processing is executed. Here, fc is the subcarrier spacing during OFDMA transmission.

Furthermore, the controller 6403 sends notification to the switch 6161 using selection signals indicating that the status of the signal received by the receiver is good and sufficient signal quality is achieved, that the status of the signal received by the receiver is poor and insufficient signal quality is achieved, and that CDT diversity is being performed.

In addition, it is assumed that θ is already known at the receiver, or having been notified in advance.

As described above, in the transmitter of the present embodiment, codes that are orthogonal in M subcarriers units (M being 2 or an integer greater than 2) are multiplied by subcarrier units and output as subcarriers for channel estimation; in an OFDM symbol in which data is transmitted, a phase rotation of (k−1)×φ is added to the phase of the kth subcarrier (where k is 1 or an integer larger than 1, and is equal to or smaller than the total number of subcarriers) which has been modulated with data; when transmitting same data to a same receiver simultaneously in conjunction with another transmitter, the data is transmitted with another value for $\phi$.

Using the transmitter and receiver shown in FIG. 21 and FIG. 22, although there is no time delay in subcarrier for channel estimation portions between transmission antennas, by appending time delay only to the data portions, the CDT diversity effect can be obtained, and even when using orthogonal codes such as OVSF codes as the subcarriers for channel estimation, orthogonality can be maintained between subcarriers for channel estimation transmitted from the respective sectors, and estimation error when estimating their channels can be suppressed.

It should be noted that in the embodiments described above, programs for realizing the functions of the subcarrier for channel estimation creation units, controllers, error correction encoding units, serial/parallel converters, mapping units, multiplex units, IFFT units, parallel/serial converters, switches, time-shift units, GI insertion units, digital/analog converters, 112, wireless transmission units, of FIGS. 3, 7, and 21, the wireless receive units, analog/digital converters, synchronization units, GI removal units, S/P converters, FFT units, subcarrier for channel estimation extractors, code multiplication units, despread units, controllers, switches, power calculation units, channel compensation units, and error correction decoders of FIGS. 5, 8, and 22 can be stored in a computer-readable recording medium; the transmitter and receiver can then be controlled by making a computer system read the programs stored in the recording medium. Here, "computer system" includes hardware such as OS and peripheral devices.

Moreover, "computer-readable recording medium" denotes a portable medium such as a flexible disk, an optical magnetic disk, a ROM, a CD-ROM, or a storage apparatus such as hardware incorporated in the computer system. "Computer-readable recording medium" also includes one that dynamically stores a program for a short time, such as a communication line used when transmitting a program via a network such as the internet and a communication line such as a telephone line, and one that stores a program for a fixed time, such as a volatile memory in computer systems that form the server and client. The program can be used in realizing some of the functions mentioned above, or it can be used in realizing those functions in combination with programs that are already stored in the computer system.

While preferred embodiments of the present invention have been described with reference to the drawing, the specific structures are not limited to these embodiments, and designs and the like that do not depart from the gist of the present invention are also been included.

INDUSTRIAL APPLICABILITY

The present invention can be applied in a transmitter that, in a cellular system using the OFDM scheme, performs communication by multiplying subcarriers for channel estimation by codes, in an OFDM communication system, and in a transmission method; it can prevent mutual interference among the subcarriers for channel estimation, increase the precision of channel estimation, and increase communication quality.

The invention claimed is:

1. A transmitter in a cellular system using an OFDM scheme, the transmitter comprising:
a multiplication unit which multiplies a subcarrier for channel estimation by a code; and
a transmission unit which performs transmission based on said multiplication, wherein
the code is such that a phase difference $\phi$ between codes multiplied with consecutive subcarriers for channel estimation is constant, and codes of every M consecutive subcarriers, M being 2 or an integer greater than 2, are mutually orthogonal with codes multiplied with same subcarriers of another transmitter,
$\phi$ satisfies $\phi \geq 2 \times G \times \pi$, G being a guard interval length when an effective OFDM symbol length is 1, and
M is a submultiple of the total number of subcarriers Nsub.

2. An OFDM communication system comprising:
the transmitter as recited in claim 1; and
a receiver which uses an FFT to frequency-convert an OFDM symbol that contains a received subcarrier for channel estimation in the case of demodulating data transmitted from one transmitter, and estimates a channel that is a frequency response with the transmitter in units of the subcarrier for channel estimation, orthogonality of the subcarrier for channel estimation being maintained on a transmission side, and uses the FFT to frequency-convert the OFDM symbol that contains the received subcarrier for channel estimation in the case of demodulating same data transmitted from two or more transmitters, and multiplies the subcarrier for channel estimation by a complex conjugate of a code used in one of the transmitters to determine a combined channel from all the transmitters.

3. The OFDM communication system as recited in claim 2, wherein
the receiver includes a function of estimating the reliability of each transmitter from the orthogonality of a signal for channel estimation.

4. A transmitter in a cellular system using an OFDM scheme, the transmitter comprising:
a multiplication unit which multiplies a subcarrier for channel estimation by a code; and
a transmission unit which performs transmission based on said multiplication, wherein
the code is such that a phase difference $\phi$ between codes multiplied with consecutive subcarriers for channel estimation is constant, and codes of every M consecutive subcarriers, M being 2 or an integer greater than 2, are mutually orthogonal with codes multiplied with same subcarriers of another transmitter,
M is a submultiple of the total number of subcarriers Nsub, and
responsive to Nsub satisfying the condition of $2^{N-1} < \text{Nsub} \leq 2^N$, N being a natural number, $\phi$ satisfies $\phi \times 2^N = 2n\pi$, n being an integer.

5. A transmitter in a cellular system using an OFDM scheme, the transmitter comprising:
a multiplication unit which multiplies subcarriers for channel estimation by codes; and
a transmission unit which performs transmission based on said multiplication, wherein
the codes includes a first code and a second code,
the first code is such that a phase difference $\phi$ between codes multiplied with consecutive subcarriers for channel estimation is constant,
codes of every M consecutive subcarriers, M being 2 or an integer greater than 2, are mutually orthogonal with the first code multiplied with same subcarriers of another transmitter,
the second code is determined on a cell-by-cell basis,
$\phi$ satisfies $\phi \geq 2 \times G \times \pi$, G being a guard interval length when an effective OFDM symbol length is 1, and
M is a submultiple of the total number of subcarriers Nsub.

6. A transmitter in a cellular system using a base station that includes a plurality of sectors using an OFDM scheme, wherein the transmitter is provided in each of the sectors and the transmitter allocates codes for creating OFDM symbols for channel estimation to respective subcarriers, the transmitter comprising:
  a phase rotation unit adding a phase rotation of $(k-1) \times \phi/n$ to a modulated phase of a kth subcarrier in every OFDM symbol, k being 1 or an integer larger than 1 and being equal to or smaller than the total number of subcarriers, wherein $\phi$ is a phase difference between codes multiplied with consecutive subcarriers for channel estimation and n is an arrangement spacing between the subcarriers for channel estimation, n being 1 or an integer larger than 1; and
  a transmission unit which performs transmission based on said phase rotation added, and
  $\phi$ is unique to each of the sectors.

7. The transmitter as recited in claim 6, wherein
  based on the occurrence that a ratio between an effective OFDM symbol length and a guard interval length that is set is 1:G, the phase difference $\phi$ is set so as to satisfy $\phi \geq 2 \times G \times \pi$.

8. An OFDM communication system comprising:
  the transmitter as recited in claim 6; and
  a receiver that uses an FFT to frequency-convert an OFDM symbol that contains a received subcarrier for channel estimation, determines a channel with the transmitter by multiplying the subcarrier for channel estimation by a complex conjugate of a code used at the transmitter, and performs an IFFT to perform conversion into an impulse response, and determines a base station or a sector or both of the base station and the sector based on a position where signal components are concentrated that is obtained from the converted result.

9. An OFDM communication system comprising:
  the transmitter as recited in claim 6; and
  a receiver that uses an FFT to frequency-convert an OFDM symbol that contains a received subcarrier for channel estimation, determines a channel with the transmitter by multiplying the subcarrier for channel estimation by a complex conjugate of a code used at the transmitter, and performs an IFFT to perform conversion into an impulse response, and extracts only a time where signal components are concentrated that is obtained from the converted result, and performs an FFT again to estimate the channel with a transmitter of a sector to be connected.

10. An OFDM communication system comprising:
  the transmitter as recited in claim 6; and
  a receiver that uses an FFT to frequency-convert an OFDM symbol that contains a received subcarrier for channel estimation, and determines a channel with the transmitter by multiplying the subcarrier for channel estimation by a complex conjugate of a code used at the transmitter.

11. A transmitter in the cellular system using the OFDM scheme, the transmitter comprises:
  a multiplication unit which multiplies a subcarrier for channel estimation by a code, wherein the code is such that a phase difference $\phi$ between codes multiplied with consecutive subcarriers for channel estimation is constant, and codes of every M consecutive subcarriers, M being 2 or an integer greater than 2, are mutually orthogonal with codes multiplied with same subcarriers of another transmitter; and
  an allocation unit which allocates the codes to the subcarriers for channel estimation and transmits as the subcarriers for channel estimation, wherein
  $\phi$ is the phase difference between the codes multiplied with the consecutive subcarriers for channel estimation,
  n is an arrangement spacing between the subcarriers for channel estimation, n being 1 or an integer larger than 1, and
  the transmitter further comprising:
  a phase rotation unit which adds a phase rotation of $(k-1) \times \phi/n$ to a modulated phase of a kth subcarrier in an OFDM symbol in which data is transmitted, k being 1 or an integer larger than 1 and being equal to or smaller than the total number of subcarriers.

12. An OFDM communication system comprising:
  the transmitter as recited in claim 11; and
  a receiver that includes a function of estimating the reliability of each transmitter from orthogonality of a signal for channel estimation.

13. An OFDM communication system comprising:
  the transmitter as recited in claim 11; and
  a receiver that uses an FFT to frequency-convert an OFDM symbol that contains a received subcarrier for channel estimation, and determines a channel with the transmitter by multiplying the subcarrier for channel estimation by a complex conjugate of a code used at the transmitter, and performs an IFFT to perform conversion into an impulse response, and determines a base station or a sector or both of the base station and the sector based on a position where signal components are concentrated that is obtained from the converted result.

14. An OFDM communication system comprising:
  the transmitter as recited in claim 11; and
  a receiver that uses an FFT to frequency-convert an OFDM symbol that contains a received subcarrier for channel estimation, and determines a channel with the transmitter by multiplying the subcarrier for channel estimation by a complex conjugate of a code used at the transmitter, and performs an IFFT to perform conversion into an impulse response, and extracts only a time where signal components are concentrated that is obtained from the converted result, and performs an FFT again to estimate the channel with a transmitter of a sector to be connected.

15. An OFDM communication system comprising:
  the transmitter as recited in claim 11; and
  a receiver that uses an FFT to frequency-convert an OFDM symbol that contains a received subcarrier for channel estimation, and determines a channel with the transmitter by multiplying the subcarrier for channel estimation by a complex conjugate of a code used at the transmitter.

16. A transmitter in a cellular system using an OFDM scheme, the transmitter comprises:
  a multiplication unit which multiplies codes that are orthogonal in M subcarrier units, M being 2 or an integer larger than 2, by a subcarrier unit; and
  a transmission unit which transmits as subcarriers for channel estimation, wherein
  $\phi$ is a phase difference between codes multiplied with consecutive subcarriers for channel estimation, and
  n is an arrangement spacing between the subcarriers for channel estimation, n being 1 or an integer larger than 1, and
  the transmitter further comprises:
  a phase rotation unit which adds a phase rotation of $(k-1) \times \phi/n$ to a modulated phase of a kth subcarrier in a OFDM symbol in which data is transmitted, k being 1 or an integer larger than 1 and being equal to or smaller than the total number of subcarriers.

17. An OFDM communication system comprising:
the transmitter as recited in claim 16;
a receiver that calculates channels with the respective transmitters responsive to receiving same data from a plurality of transmitters, and further calculates a combined channel responsive to receiving data from the respective channels.

18. A transmitter in a cellular system using an OFDM scheme for frequency and time division access, the transmitter comprising:
a multiplication unit which multiplies codes; and
a transmission unit which transmits a code where a phase difference $\phi$ between codes multiplied with consecutive subcarriers for channel estimation is constant, and codes of every M consecutive subcarriers, M being 2 or an integer greater than 2, are mutually orthogonal to codes multiplied with same subcarriers of another transmitter, to a receiver as subcarriers for channel estimation, wherein
n is an arrangement spacing between the subcarriers for channel estimation, n being 1 or an integer larger than 1, and using a same frequency band for transmitting same data to a same receiver simultaneously in conjunction with the other transmitter, and
the transmitter further comprising:
a phase rotation unit which adds a phase rotation of $(m-1)\times \phi/n$ to a phase of an mth subcarrier that is modulated with data, m being 1 or an integer larger than 1 and is equal to or smaller than the total number of subcarriers in a communication band.

19. An OFDM communication system comprising:
the transmitter as recited in claim 18; and
a receiver that transmits control data of each slot, uses an FFT to frequency-convert an OFDM symbol that contains a received subcarrier for channel estimation, determines a channel with the transmitter by multiplying the subcarrier for channel estimation by a complex conjugate of a code used at the transmitter, further demodulates a slot to be received and control data for demodulating data relating to modulation from control data that has been received, and demodulates a data slot addressed to a self terminal.

20. A transmission method in a cellular system using an OFDM scheme, for allocating the codes as recited in claim 19 to the subcarriers for channel estimation and transmitting as the subcarriers for channel estimation, wherein $\phi$ is the phase difference between the codes multiplied with the consecutive subcarriers for channel estimation and n is an arrangement spacing between the subcarriers for channel estimation, n being 1 or an integer larger than 1, further adding a phase rotation of $(k-1)\times\phi/n$ to a modulated phase of a kth subcarrier in an OFDM symbol in which data is transmitted, k being 1 or an integer larger than 1 and being equal to or smaller than the total number of subcarriers.

21. A transmission method in a cellular system using an OFDM scheme, the transmission method comprises:
multiplying a subcarrier for channel estimation by a code; and
performing transmission, wherein
the code is such that a phase difference $\phi$ between codes multiplied with consecutive subcarriers for channel estimation is constant,
codes of every M consecutive subcarriers, M being 2 or an integer greater than 2, are mutually orthogonal with codes multiplied with same subcarriers of another transmitter,
$\phi$ satisfies $\phi \geq 2\times G\times\pi$, G being a guard interval length when an effective OFDM symbol length is 1, and
M is a submultiple of the total number of subcarriers Nsub.

22. A transmission method in a cellular system using an OFDM scheme, the transmission method comprising:
multiplying a subcarrier for channel estimation by codes; and
performing transmission, wherein
the codes including a first code and a second code,
the first code being such that a phase difference $\phi$ between codes multiplied with consecutive subcarriers for channel estimation is constant,
codes of every M consecutive subcarriers, M being 2 or an integer greater than 2, are mutually orthogonal with the first code multiplied with same subcarriers of another transmitter,
the second code being determined on a cell-by-cell basis,
$\phi$ satisfies $\phi \geq 2\times G\times\pi$, G being a guard interval length when an effective OFDM symbol length is 1, and
M is a submultiple of the total number of subcarriers Nsub.

23. A transmission method provided in each of a plurality of sectors in a cellular system using a base station that includes the sectors using an OFDM scheme, the transmission method comprising:
allocating codes for creating OFDM symbols for channel estimation to respective subcarriers;
allocating communication data to the respective subcarriers, wherein $\phi$ is a phase difference between codes multiplied with consecutive subcarriers for channel estimation and n is an arrangement spacing between subcarriers for channel estimation, n being 1 or an integer larger than 1;
adding a phase rotation of $(k-1)\times\phi/n$ to a modulated phase of a kth subcarrier in every OFDM symbol, k being 1 or an integer larger than 1 and being equal to or smaller than the total number of subcarriers, wherein
$\phi$ being unique to each of the sectors.

24. A transmission method in a cellular system using an OFDM scheme, the transmission method comprising:
multiplying codes that are orthogonal in M subcarrier units, M being 2 or an integer larger than 2, by a subcarrier unit; and
transmitting as subcarriers for channel estimation, wherein
$\phi$ is a phase difference between codes multiplied with consecutive subcarriers for channel estimation, and
n is an arrangement spacing between the subcarriers for channel estimation, n being 1 or an integer larger than 1, further adding a phase rotation of $(k-1)\times\phi/n$ to a modulated phase of a kth subcarrier in a OFDM symbol in which data is transmitted, k being 1 or an integer larger than 1 and being equal to or smaller than the total number of subcarriers.

* * * * *